US011500056B2

(12) United States Patent
Wu et al.

(10) Patent No.: US 11,500,056 B2
(45) Date of Patent: Nov. 15, 2022

(54) METHOD, APPARATUS, AND SYSTEM FOR WIRELESS TRACKING WITH GRAPH-BASED PARTICLE FILTERING

(71) Applicants: Chenshu Wu, Hong Kong (CN); Feng Zhang, Greenbelt, MD (US); Beibei Wang, Clarksville, MD (US); K. J. Ray Liu, Potomac, MD (US); Oscar Chi-Lim Au, San Jose, CA (US)

(72) Inventors: Chenshu Wu, Hong Kong (CN); Feng Zhang, Greenbelt, MD (US); Beibei Wang, Clarksville, MD (US); K. J. Ray Liu, Potomac, MD (US); Oscar Chi-Lim Au, San Jose, CA (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/871,000

(22) Filed: May 10, 2020

(65) Prior Publication Data
US 2020/0271749 A1    Aug. 27, 2020

Related U.S. Application Data

(63) Continuation of application No. 15/326,112, filed as application No. PCT/US2015/041037 on Jul. 17, (Continued)

(51) Int. Cl.
*G01S 5/06*   (2006.01)
*G01S 5/02*   (2010.01)

(52) U.S. Cl.
CPC .............. *G01S 5/06* (2013.01); *G01S 5/0226* (2013.01); *G01S 5/0252* (2013.01); *G01S 5/0273* (2013.01)

(58) Field of Classification Search
CPC combination set(s) only.
See application file for complete search history.

(56) References Cited

U.S. PATENT DOCUMENTS

| 2005/0079877 A1* | 4/2005 | Ichimura | G01C 21/32 455/456.1 |
| 2008/0077326 A1* | 3/2008 | Funk | G08B 25/016 701/500 |

(Continued)

OTHER PUBLICATIONS

Seifeldin et al. "Nuzzer: A Large-Scale Device-Free Passive Localization System for Wireless Environments", Aug. 6, 2009 (Year: 2009).*

(Continued)

*Primary Examiner* — Zhiyu Lu

(57) ABSTRACT

Methods, apparatus and systems for wireless tracking with graph-based particle filtering are described. A described wireless monitoring system comprises a transmitter transmitting a series of probe signals, a receiver, and a processor. The receiver is configured for: receiving the series of probe signals modulated by the wireless multipath channel and an object moving in a venue, and obtaining a time series of channel information (TSCI) of the wireless multipath channel from the series of probe signals. The processor is configured for: monitoring a motion of the object relative to a map based on the TSCI, determining an incremental distance travelled by the object in an incremental time period based on the TSCI, and computing a next location of the object at a next time in the map based on at least one of: a current location of the object at a current time, the incremental distance, and a direction of the motion during the incremental time period.

29 Claims, 16 Drawing Sheets

Related U.S. Application Data 2015, application No. 16/871,000, which is a continuation-in-part of application No. 16/127,151, filed on Sep. 10, 2018, now Pat. No. 11,012,285, which is a continuation-in-part of application No. PCT/US2017/021963, filed on Mar. 10, 2017, application No. 16/871,000, which is a continuation-in-part of application No. 16/125,748, filed on Sep. 9, 2018, now Pat. No. 10,833,912, which is a continuation-in-part of application No. PCT/US2017/015909, filed on Jan. 31, 2017, application No. 16/871,000, which is a continuation-in-part of application No. 15/861,422, filed on Jan. 3, 2018, now Pat. No. 11,025,475, and a continuation-in-part of application No. 16/200,608, filed on Nov. 26, 2018, now Pat. No. 10,735,298, and a continuation-in-part of application No. 16/446,589, filed on Jun. 19, 2019, now Pat. No. 10,742,475, and a continuation-in-part of application No. 16/667,648, filed on Oct. 29, 2019, now Pat. No. 11,035,940, and a continuation-in-part of application No. 16/667,757, filed on Oct. 29, 2019, now abandoned, and a continuation-in-part of application No. 16/790,610, filed on Feb. 13, 2020, and a continuation-in-part of application No. 16/790,627, filed on Feb. 13, 2020, now Pat. No. 11,397,258, and a continuation-in-part of application No. 16/798,337, filed on Feb. 22, 2020, now Pat. No. 10,845,463, and a continuation-in-part of application No. 16/798,343, filed on Feb. 22, 2020, now Pat. No. 11,340,345.

(60) Provisional application No. 62/846,686, filed on May 12, 2019, provisional application No. 62/846,688, filed on May 12, 2019, provisional application No. 62/849,853, filed on May 18, 2019, provisional application No. 62/868,782, filed on Jun. 28, 2019, provisional application No. 62/873,781, filed on Jul. 12, 2019, provisional application No. 62/900,565, filed on Sep. 15, 2019, provisional application No. 62/902,357, filed on Sep. 18, 2019, provisional application No. 62/950,093, filed on Dec. 18, 2019, provisional application No. 62/977,326, filed on Feb. 16, 2020, provisional application No. 62/980,206, filed on Feb. 22, 2020, provisional application No. 62/981,387, filed on Feb. 25, 2020, provisional application No. 62/984,737, filed on Mar. 3, 2020, provisional application No. 63/001,226, filed on Mar. 27, 2020.

(56) References Cited

U.S. PATENT DOCUMENTS

| | | | |
|---|---|---|---|
| 2012/0319903 A1* | 12/2012 | Huseth | G01S 3/74 342/386 |
| 2013/0047106 A1* | 2/2013 | Sasayama | G01C 21/3673 715/766 |
| 2014/0141796 A1* | 5/2014 | Marti | G01S 5/0294 455/456.1 |
| 2014/0141803 A1* | 5/2014 | Marti | H04W 4/029 455/456.2 |
| 2014/0156180 A1* | 6/2014 | Marti | G01S 5/0252 701/423 |
| 2014/0171098 A1* | 6/2014 | Marti | H04W 4/025 455/456.1 |
| 2014/0171114 A1* | 6/2014 | Marti | G01C 21/10 455/456.2 |
| 2014/0171118 A1* | 6/2014 | Marti | H04W 4/38 455/456.3 |
| 2017/0074980 A1* | 3/2017 | Adib | G01S 13/72 |
| 2021/0180955 A1* | 6/2021 | Yang | H04W 4/029 |

OTHER PUBLICATIONS

Joshi et al., "WiDeo: Fine-grained Device-free Motion Tracing using RF Backscatter", May 4, 2015, Proceedings of the 12th USENIX Symposium on Networked Systems Design and Implementation (NSDI '15) (Year: 2015).*

Huang et al., "Feasibility and Limits of Wi-Fi Imaging", Nov. 2014, SenSys'14 (Year: 2014).*

* cited by examiner

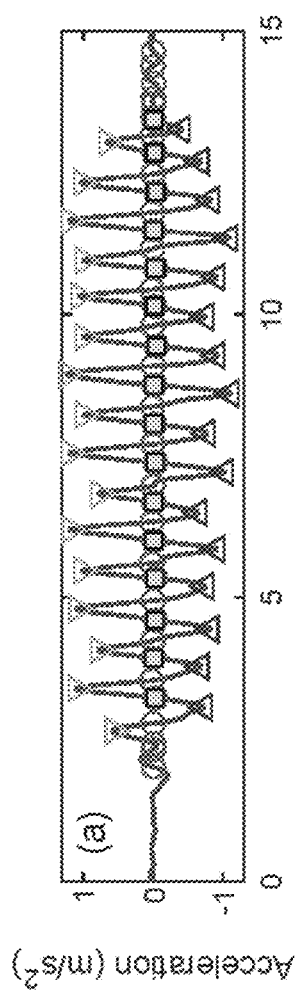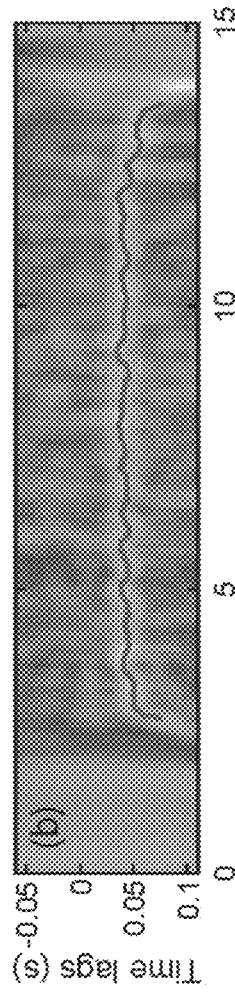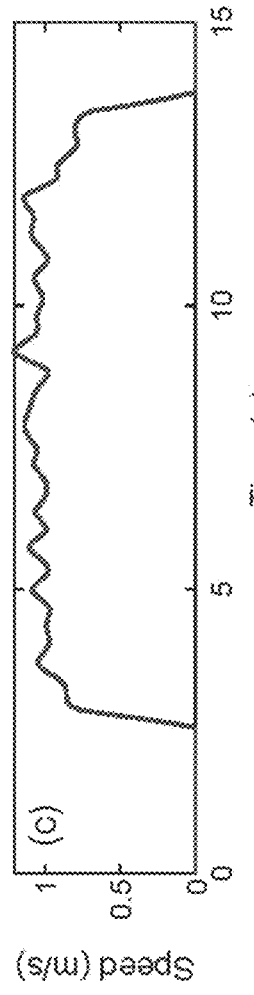
FIG. 13A
FIG. 13B
FIG. 13C

METHOD, APPARATUS, AND SYSTEM FOR WIRELESS TRACKING WITH GRAPH-BASED PARTICLE FILTERING

CROSS-REFERENCE TO RELATED APPLICATIONS

The present application is related to U.S. patent application 16/870,996, entitled "METHOD, APPARATUS, AND SYSTEM FOR WIRELESS INERTIAL MEASUREMENT," filed on May 10, 2020, which is expressly incorporated by reference herein in its entirety.

The present application hereby incorporates by reference the entirety of the disclosures of, and claims priority to, each of the following cases:

(a) U.S. patent application Ser. No. 15/326,112, entitled "WIRELESS POSITIONING-SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, ANT) SYSTEMS F(I)R VITAL SIGNS DETECTION ANTMONITORING", filed on Mar. 10, 2017, published as WO2017/156492A1 on Sep. 14, 2017,
(c) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  (1) which is a continuation-in-part of PCT patent application PCT/US2017/015909, entitled "METHODS, DEVICES, SERVERS, APPARATUS, ANT) SYSTEMS FOR WIRELESS INTERNET OF THINGS APPLICATIONS", filed on Jan. 31, 2017, published as WO2017/155634A1 on Sep. 14, 2017,
(d) U.S. patent application Ser. No. 15/861,422, entitled "METHOD, APPARATUS, SERVER, AND SYSTEMS OF TIME-REVERSAL TECHNOLOGY", filed on Jan. 3, 2018,
(e) U.S. patent application Ser. No. 16/200,608, entitled "METHOD, APPARATUS, SERVER AND SYSTEM FOR VITAL SIGN DETECTION AND MONITORING", filed on Nov. 26, 2018,
(f) U.S. Provisional Patent application 62/846,686, entitled "METHOD, APPARATUS, AND SYSTEM FOR WIRELESS INERTIAL MEASUREMENT", filed on May 12, 2019,
(g) U.S. Provisional Patent application 62/846,688, entitled "Method, Apparatus, and System for Processing and Presenting Life Log based on a Wireless Signal", filed on May 12, 2019,
(h) U.S. Provisional Patent application 62/849,853, entitled "Method, Apparatus, and System for Wireless Artificial Intelligent in Smart Car", filed on May 18, 2019,
(i) U.S. patent application Ser. No. 16/446,589, entitled "METHOD, APPARATUS, AND SYSTEM FOR OBJECT TRACKING AND SENSING USING BROADCASTING", filed on Jun. 19, 2019,
(j) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019,
(k) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019,
(l) U.S. Provisional Patent application 62/900,565, entitled "QUALIFIED WIRELESS SENSING SYSTEM", filed on Sep. 15, 2019,
(m) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019,
(n) U.S. patent application Ser. No. 16/667,648, entitled "METHOD, APPARATUS, AND SYSTEM FOR WIRELESS PROXIMITY AND PRESENCE MONITORING", filed on Oct. 29, 2019,
(o) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019,
(p) U.S. Provisional Patent application 62/950,093, entitled "METHOD, APPARATUS, AND SYSTEM FOR TARGET POSITIONING", filed on Dec. 18, 2019,
(q) U.S. patent application Ser. No. 16/790,610, entitled "METHOD, APPARATUS, AND SYSTEM FOR WIRELESS GAIT RECOGNITION", filed Feb. 13, 2020,
(r) U.S. patent application Ser. 16/790,627, entitled "METHOD, APPARATUS, AND SYSTEM FOR OUTDOOR TARGET TRACKING", filed Feb. 13, 2020.
(s) U.S. Provisional Patent application 62/977,326, entitled "METHOD, APPARATUS, ANI) SYSTEM FOR AUTOMATIC ANI) ADAPTIVE WIRELESS MONITORING AND TRACKING", filed on Feb. 16, 2020,
(t) U.S. patent application Ser. No. 16/798,337, entitled "METHOD, APPARATUS, AND SYSTEM FOR WIRELESS OBJECT SCANNING", filed Feb. 22, 2020,
(u) U.S. patent application Ser. No. 16/798,343, entitled "METHOD, APPARATUS, AND SYSTEM FOR WIRELESS OBJECT TRACKING", filed Feb. 22, 2020,
(v) U.S. Provisional Patent application 62/980,206, entitled "METHOD, APPARATUS, AND SYSTEM FOR WIRELESS SENSING", filed on Feb. 22, 2020,
(w) U.S. Provisional Patent application 62/981,387, entitled "METHOD, APPARATUS, AND SYSTEM FOR VEHICLE WIRELESS MONITORING", filed on Feb. 25, 2020,
(x) U.S. Provisional Patent application 62/984,737, entitled "METHOD, APPARATUS, AND SYSTEM FOR IMPROVED WIRELESS MONITORING", filed on Mar. 3, 2020,
(y) U.S. Provisional Patent application 63/001,226, entitled "METHOD, APPARATUS, AND SYSTEM FOR IMPROVED WIRELESS MONITORING AND USER INTERFACE", filed on Mar. 27, 2020.

TECHNICAL FIELD

The present teaching generally relates to wireless tracking system. More specifically, the present teaching relates to accurately tracking moving distance, heading direction, and rotating angle based on wireless channel information in a rich-scattering environment.

BACKGROUND

Motion measurements are essential inputs for a range of applications such as robot navigation, indoor tracking, and mobile gaming, etc., and have been widely used in robots, drones, automotive, unmanned vehicles, various consumer electronics, and pretty much anything that moves. The mainstream technology has been using Inertial Measurement Units (IMUS) for motion tracking. The rise in demand of accurate and robust motion tracking, coupled with an increase in smart device production, has been driving the IMU market, which is projected to grow from $15.71 billion in 2016 to $21.74 billion by 2022. An improvement to motion measurements will profoundly impact a number of systems and applications.

Precise and robust motion measurement is non-trivial. The prevalent IMUS realized by sensors, e.g. accelerometers that measure linear acceleration, gyroscopes that calculate angular velocity, and magnetometers that report orientation, are well known to suffer from significant errors and drifts. For example, an accelerometer is hardly capable of measuring moving distance due to the noisy readings; a magnetometer does not report heading direction and is easily distorted by surrounding environments; while a gyroscope experiences considerable drifts introduced by integration especially in a long run. These limitations prevent many applications that require accurate motion processing, such as indoor tracking, virtual reality, and motion sensing games.

In recent years, radio signals are used to localize and track targets. But these systems can only track locations while suffering from significant common limitations that prohibit ubiquitous accurate inertial measurements. First, these systems all require one or more precisely installed APs (Access Points), as well as accurate information about their locations and/or orientations. A small error in the APs' geometry information will lead to large location errors, Second, these systems can only determine one or two of multiple motion parameters from successive location estimates. They do not directly measure multiple motion parameters, and cannot track in-place angular motion. Third, these systems face accuracy limitations dictated by frequency bandwidth, antenna amount, and synchronization errors on commercial off-the-shelf (COTS) WiFi, and degenerate or even fail in complex Non-Line-Of-Sight (NLOS) scenarios.

SUMMARY

The present teaching generally relates wireless tracking system, More specifically, the present teaching relates to accurately tracking moving distance, heading direction, and rotating angle based on wireless channel information in a rich-scattering environment.

In one embodiment, a wireless monitoring system is described. The wireless monitoring system comprises: a transmitter, a receiver, and a processor. The transmitter is configured for transmitting a series of probe signals in a venue through a wireless multipath channel. The receiver is configured for: receiving, through the wireless multipath channel between the transmitter and the receiver, the series of probe signals modulated by the wireless multipath channel and an object moving in the venue, and obtaining a time series of channel information (TSCI) of the wireless multipath channel from the series of probe signals modulated by the wireless multipath channel and the object. The processor is configured for: monitoring a motion of the object relative to a map based on the TSCI, determining an incremental distance travelled by the object in an incremental time period based on the TSCI, and computing a next location of the object at a next time in the map based on at least one of: a current location of the object at a current time, the incremental distance, and a direction of the motion during the incremental time period. According to various embodiments, the processor is physically coupled to at least one of the transmitter and the receiver.

In another embodiment, a method, implemented by a processor, a memory communicatively coupled with the processor, and a set of instructions stored in the memory to be executed by the processor, is described. The method comprises: obtaining a time series of channel information (TSCI) of a wireless multipath channel in a venue, wherein: the TSCI is extracted from a series of probe signals transmitted from a transmitter to a receiver through the wireless multipath channel, the series of probe signals are modulated by the wireless multipath channel and an object moving in the venue; monitoring a motion of the object relative to a map based on the TSCI; determining an incremental distance travelled by the object in an incremental time period based on the TSCI; and computing a next location of the object at a next time in the map based on at least one of: a current location of the object at a current time, the incremental distance, and a direction of the motion during the incremental time period.

In a different embodiment, a wireless monitoring system is described. The wireless monitoring system comprises: a transmitter, a plurality of heterogeneous receivers, and a processor. The transmitter is configured for transmitting a series of probe signals in a venue through a wireless multipath channel. Each of the plurality of heterogeneous receivers is configured for: receiving, through the wireless multipath channel, the series of probe signals modulated by the wireless multipath channel and a plurality of objects moving in the venue, and obtaining a time series of channel information (TSCI) of the wireless multipath channel from the series of probe signals modulated by the wireless multipath channel and the plurality of objects. The processor is configured for: monitoring motions of the plurality of objects relative to a map based on the TSCIs obtained by the plurality of heterogeneous receivers, determining a respective incremental distance travelled by each object in a respective incremental time period based on a respective TSCI, and computing a respective next location of the object at a respective next time in the map based on at least one of: a respective current location of the object at a respective current time, the respective incremental distance, and a respective direction of the respective motion of the object during the respective incremental time period. According to various embodiments, the processor is physically coupled to at least one of: the transmitter and the plurality of heterogeneous receivers.

Other concepts relate to software for implementing the present teaching on wireless object tracking in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIGS. 13A-13C illustrate examples of an inertial-based step counting and radio-based distance estimation, according to some embodiments of the present disclosure.

DETAILED DESCRIPTION

Figure 1:
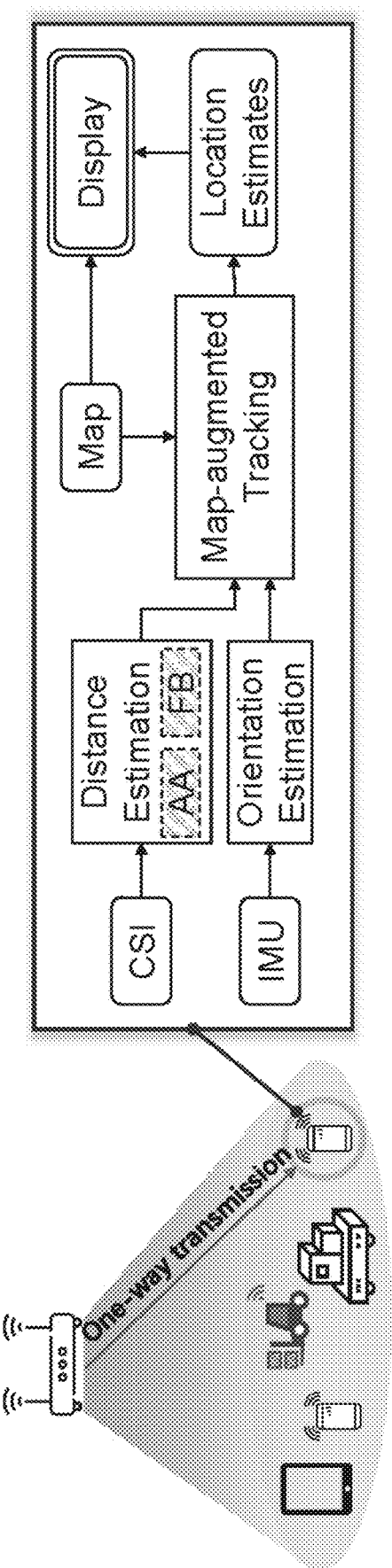
FIG. 1 illustrates an overall architecture of an indoor tracking system, according to some embodiments of the present disclosure.

In the following detailed description, numerous specific details are set forth by way of examples in order t© provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (IA) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed /ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BILE, Zigbee, RFID, UWB, WiMax) compliant signal, protocol signal, standard frame, beacon/pilot/probe/inquiry/acknowledgement/hand shake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, inquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g., map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modern, RF front end, RF/radio chip or integrated circuit (IC).

At least one of: Type 1 device, Type 2 device, a link between them, the object, the characteristics, the STI, the monitoring of the motion, and the task may be associated with an identification (ID) such as QUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI. The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a re-training, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated. There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device). Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second. Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object. The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals. For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-story building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address. A location of a Type 2 device in the venue may be computed based on the particular MAC address, the series of probe signals, and/or the at least one TSCI obtained by the Type 2 device from the probe signals. The computing may be performed by the Type 2 device. The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel. The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, NEC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different. The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same. The first series of probe signals may be transmitted at a first rate (e.g. 30 Hz). The second series of probe signals may be transmitted at a second rate (e.g. 200 Hz), The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time. The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSD, home device, office device, and/or manufacturing device. Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device. The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for &witching signal source, and/or information of a user, account, access info, parameter, characteristics, and/or signal strength (e.g. associated with the Type 1 device and/or the respective Type 2 receiver). Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g., between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1,1, 1,2, or 1.5) of the current signal source. If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01s for 100 Hz), but each probe signal may experience small time perturbation, perhaps due to timing requirement, timing control, network control, handshaking, message passing, collision avoidance, carrier sensing, congestion, availability of resources, and/or another consideration. The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually. The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc. The two channels may be associated with different kinds of wireless system (e.g. two of the following: WiFi, LTE, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zig-bee, NFC, WiMax, Bluetooth, BLE, REID, UWB, microwave system, radar like system). For example, one is WiFi and the other is LTE. The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.). For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event. At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second. Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device. A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second. Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting /ending time, and/or another segment (e.g, subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section, A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1-D1, wherein Di is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X^a$, $Y^b$, abs($X^a$−$Y^b$), $(X-Y)^{\hat{}}$, (X/Y), (X+a)/(Y+b), ($X^a$/$Y^b$), and $((X/Y)^a-b)$, wherein a and b are may be some predetermined quantities. For example, the function may simply be abs(X−Y), or $(X-Y)^2$, $(X-Y)^4$, The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X−Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X=($x_1$, $x_2$, ..., $x_n$) and Y=($y_1$, $y_2$, ..., $y_n$). The function may be a function of at least one of: $x_i$, $y_i$, ($x_i-y_i$), ($y_i-x_i$), abs($x_i-y_i$), $x_i^a$, $y_i^b$, abs($x_i^a-y_i^b$), $(x_i-y_i)^a$, ($x_i/y_i$), ($x_i+a$)/($y_i+b$), ($x_i^a/y_i^b$), and $((x_i/y_i)^a-b)$, wherein i is a component index of the n-tuple X and Y, and $1>=i>=n$. E.g. component index of $x_1$ is i=1, component index of $x_2$ is i=2. The function may comprise a component-by-component summation of another function of at least one of the following: $x_i$, $y_i$, ($x_i-y_i$), ($y_i-x_i$), abs($x_i-y_i$), $x_i^a$, $y_i^b$, abs($x_i^a-y_i^b$), $(x_i-y_i)^a$, ($x_i/y_i$), ($x_i+a$)/($y_i+b$), ($x_i^a/y_i^b$), and $((x_i/y_i)^a-b)$, wherein i is the component index of the n-tuple X and Y. For example, the function may be in a form of $\sum_{i=1}^{n}(abs(x_i/y_i)-1)$, n, or $\sum_{i=1}^{n} w_i * (abs(x_i/y_i)-1$, where $w_i$ is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i^{th}$ domain item is mapped to the $j^{th}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, ...), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated. The first section of the first time duration of the first TSCI may be a sliding section of the first TSCI. The second section of the second time duration of the second TSCI may be a sliding section of the second TSCI. A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%). In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second ISO. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier. The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information, transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. suhcarriers) in a bandwidth, channel characteristics, channel filter response, timestamp, auxiliary information, data, meta data, user data, account data, access data, security data, session data, status data, supervisory data, household data, identity UD), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise NI components (e.g. N1 frequency domain components in CFR, N1 time domain components in CM, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into NI component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g, 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI.

The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, L_1 norm, L_2 norm, L_k norm for k>2, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified /computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dangle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID), The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1, device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object. The object itself may be communicatively coupled with some network, such as WiFi, MiFi, 3G/4G/LTE/SG/6G/7G, Bluetooth, NFC, BLE, WiMax, Zigbee, UMTS, 3GPP, GSM, EDGE, TDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, de-noising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter es. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space. The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, serial port, parallel port, and other connectors) and/or a connection (e.g. Bluetooth, Bluetooth Low Energy (BLE), LTE, NEC, ZigBee), The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/head wear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g, an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car). The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on ISO between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming, back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/ preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music,/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACT for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 (1 Hz radio, 5 (1 Hz radio, 5,9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, LTE, LTE-A, LTE-U, 802,11 standard, 802.11a, 802.11b, 802.11g, 802,11n, 802.11ac, 802.11ad, 802.11af, 802,11 ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UNITS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically. Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCL autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARIA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (UFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another ISO, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, filbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc. Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak peaks that may have happened in the past, especially those peaks that have been identified for a long time. For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum apostetior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STUsize/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g, offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function. The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost. The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

in the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.). The location may be 2-dimensional (e.g. with 2D coordinates), 3-dimensional (e.g. with 31) coordinates), The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc. The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.) Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house, He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g, an SMS text message, an email, a push message to the mobile phone app, etc.). If Stephen pays a monthly fee (e.g. S10/month), a service company (e.g. security company) will receive the warning signal through wired network (e.g. broadband) or wireless network (e.g. home WiFi, LTE, 3G. 2.5(1, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away. Sometime later, Stephen is convinced that the disclosed wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease), The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and. Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UNITS devices, 3GPP devices, GSM devices, EDGE devices, TDMA devices, FDMA, devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface(UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UNITS, 3GPP, GSM, EDGE, TDMA, FDMA, CDMA, WCDMA, TD-SCDMA), cellular device, base station, mobile network base station, mobile network hub, mobile network compatible device, LTE device, device with LIE module, mobile module (e.g. circuit board with mobile-enabling chip (IC) such as Wi-Fi chip, LTE chip, BLE chip), Wi-Fi chip (IC), LIE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL, modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

In an example, Peter has enjoyed using GPS-based mapping-navigation software (GPS app) on his smartphone as he travels around US, and predominantly New York metropolitan area where he lives. The GPS app allows him to go to any new places (by entering the destination into the app) without getting lost. The GPS app allows him to see his position on a map as he moves, whether by car or on foot. And it can give him real-time traffic information so that he can get to his destination in the shortest time, or without paying toll, or without going onto highway. And it can re-route when he makes the wrong turn.

However, the GPS app does not work in many of his favorite indoor places in New York that Peter often goes, including shopping mall, sports stadium, hospital (to see grandpa who is sick) and New York MK airport. Peter has been hoping that someone would come up with a good indoor mapping-navigation software that works well both outdoor and indoor.

Peter is delighted to learn that the Origin Wireless (OW) has partner with a telecommunication company to provide several indoor/locationing/tracking/navigation solutions. He quickly downloads the software package and installs the OW client app on the mobile device. He learns that recently the telecommunication company has deployed OW beacon software on numerous WiFi routers (e.g. Type 1 heterogeneous wireless device, stationary) of the telecommunication company deployed extensively around major US cities (including New York) and indeed everywhere in the US. The OW beacon software successfully turn the WiFi routers of the telecommunication company into beacon devices to send GPS-like navigational WiFi beacon signals to mobile devices (e.g. Type 2 heterogeneous wireless device, with processor, memory and a set of instructions) everywhere in the US. When Peter is in a shopping mall, the OW client app controls Peter's mobile device to pick up the navigational WiFi beacon signals from a nearby WiFi router of the telecommunication company in the mall, and to compute the current location spatial-temporal information (STI) using the disclosed method and system herein. With the updated location, the OW client app connects to a server through a network (Internet) to update the map as Peter moves.

Peter likes the OW client app because it often provides coupons of nearby stores, shopping hints, current sale items, daily specials, and many locations of interest (e.g. rest room, water fountain, restaurants, food courts, cinemas, mall exits). With the click of a button, the stores in the mall are labelled in a GUI. When he clicks into the ABC Restaurant he wants to visit, he can see many relevant information such as store hours, waiting time, and other information such as promotions, reviews and ratings. He can enter himself into a queue for a table of 2. He can even browse the menu and choose the dishes to order while waiting at the parking lot for his girlfriend to arrive. When he clicks a map icon, a navigational path is immediately generated that would guide Peter to the restaurant in the shortest time, avoiding the rush hour crowd and the closed-off area due to renovation. He especially like that the OW client app can use GPS to navigate outdoor and transition seamlessly to use the OW system to navigate indoor. It is going to be a perfect dating night.

The present disclosure introduces EasiTrack, an indoor tracking system that achieves decimeter accuracy using a single commodity WiFi Access Point (AP) and can be deployed at scale with almost zero costs. EasiTrack makes two key technical contributions: First, it incorporates algorithms that can accurately inter a target's moving distance using the RF signals received by itself. Second, EasiTrack devises a map-augmented tracking algorithm that outputs fine-grained locations by jointly leveraging the distance estimates and an indoor map that is ubiquitously available nowadays. The present teaching discloses a fully functional real-time system centering around a satellite-like architecture, which enables EasiTrack to support any number of clients. One can have deployed EasiTrack in different scenarios (including offices, hotels, museums, and manufacturing facilities) track both humans and machines. The results reveal that EasiTrack achieves a median 0.58 m and 90% tile 1.33 m location accuracy in both LOS and NLOS scenarios and supports a large coverage of 50 m×50 m using a single AP. It is also verified that EasiTrack can be easily deployed at many buildings with little cost.

Indoor location systems using commodity off-the-shelf (COTS) WiFi are among the most promising solutions for ubiquitous tracking thanks to the wide availability of already deployed WiFi infrastructure. They should ideally satisfy the following four requirements:

Low(Zero)-cost: They should be easy to install and deploy with low or ideally zero efforts. Ideally, they should be able to locate a mobile device using a single arbitrarily installed AP (even without knowing any of its information like location and orientation), without requiting any hardware changes at either side.

Scalable: The systems should be scalable in two folds: They should transfer to a large number of different buildings, and should support large populations of concurrent mobile devices, just as GPS does, both with negligible costs.

Large coverage: The systems should cover a large area, be it close or at distance, having Line-Of-Sight (LOS) or behind multiple walls to the AP, with consistently high accuracy, Accurate: They should be able to provide sub-meter accuracy, as demanded by many applications. Such accuracy is needed to enable in-building navigation, for example, directing a customer to a product in the store or a robot to a work station.

If the above requirements are all satisfied, one can imagine indoor location system becomes a ubiquitous "indoor GPS" that is made available anywhere having WiFi signals and for any device with a commodity WiFi chip.

No existing technology satisfies all these requirements. Recent techniques based on Angle of Arrival (AoA) or Time of Flight (ToF) could yield sub-meter median accuracy. However, they usually require large bandwidth (for ToF) and many phased antennas (for AoA) for good performance, both of which are limited on COTS WiFi. Moreover, they all require precise installation of multiple APs (to obtain their reference locations and orientations), Fingerprint-based approaches are neither accurate enough nor cost efficient due to expensive prior training. Other technologies combining with inertial sensors are deployable but have limited accuracy. The latest released 802.11mc supports round-trip time measurements, but does not offer sub-meter resolution either, and still needs multiple APs for multilateration.

The present teaching discloses EasiTrack, an indoor tracking system that meets all the four requirements above. EasiTrack achieves sub-meter accuracy in both LOS and Non-LOS (NLOS) scenarios using a single AP, without knowing its location. It can be easily deployed at scale, with no extra inputs but a digital floorplan of the area of interests, which would be needed anyway for most location-based services and is ubiquitously available. EasiTrack's architecture centers around a satellite-like design, which supports a number of concurrent clients without affecting the channel capacity, and preserves privacy since a client never needs to announce its presence but only passively listens to the AP.

When a client moves, EasiTrack first estimates the moving distance from its measured Channel State information (CSI) and infers the moving direction from the built-in inertial sensors. It then employs a novel map-augmented tracking algorithm to incorporate distance and orientation estimates, which outputs fine-grained locations. Specifically, EasiTrack advances the state-of-the-art in tracking in two distinct ways:

(1) Distance estimation by leveraging multipaths: EasiTrack first contributes a super-resolution distance estimation algorithm, which accurately estimates the incremental displacement of a moving radio merely by the CSI measured by itself. The disclosed unique insight is that, when an array translates, two of its antennas may traverse through the same location in the space, one preceded by the other with a certain time delay, during which the array will have traveled for exactly a distance equal to the antenna separation. As such, one can design algorithms to continuously track the time delays by using rich multipaths indoors as distinctive location profiles. The moving speeds can be calculated by dividing the antenna separation by the time delays, and the moving distance can accordingly be derived by integrating speeds over time. The algorithm is demonstrated to be highly accurate, yet only suitable for relatively constrained movements, such as shopping carts, robots, and automated guided vehicles (AGVs). To enable EasiTrack for free human tracking as well, one can further incorporate a recent approach developed in that infers moving distances for unconstrained motions from CSI. Then one can design a universal architecture that allows switching the two approaches for different scenarios. By truly leveraging multipaths, instead of resolving and combating them as previous works, EasiTrack's distance estimation is location independent, working under both LOS and NLOS conditions.

(2) Map-augmented location tracking: While the distance estimation is rather accurate, it does not ensure sub-meter tracking accuracy when coupled with orientations obtained by inertial sensors, which stiffer from significant accumulative errors. EasiTrack employs indoor maps to cope with these uncertainties. Imagine that Google Maps improves GPS accuracy using outdoor road maps to place a car on the correct road. Similarly, indoor maps impose geometric constraints to a target's in-building movements. For example, a user does not penetrate a wall.

This observation leads to design a map-augmented algorithm for accurate indoor tracking. The disclosed algorithm models indoor map as a weighted graph and feeds it into a novel graph-based particle filter (GPF), which jointly handles distance and orientation errors and outputs accurate locations. The graph-based model enables EasiTrack to use a small number of particles (e.g., 50), thereby making it run in real-time even on resource-limited devices. Also, the disclosed GPF requires merely information on accessible and inaccessible areas from the map, which can be directly extracted from a plain floorplan image. It does not need any structured knowledge, such as corridors, crossings, doors, or rooms, etc. Thus, EasiTrack can easily scale to many buildings with little cost.

A fully functional real-time system of EasiTrack is built, including hardware prototype using commodity WiFi chipsets, and software sets. To comprehensively evaluate the accuracy and deployment simplicity, one can have deployed EasiTrack in diverse environments to track both humans and machines, including three office buildings, one museum, one hotel, and two manufacturing facilities. The disclosed key results reveal the following: 1) EasiTrack achieves a median 0.58 m and 90% tile 1.33 m location error for tracking objects, and a median 0.70 m and 90% tile 1.97 m error for tracking humans, in both LOS and NLOS conditions with a single AP. 2) It is almost zero cost to deploy EasiTrack in a new building. Provided the map, the AP can be set up in minutes at any location that provides coverage. 3) EasiTrack can provide a large tracking coverage comparable to the AP's signal coverage. In the disclosed deployment, it can track over a 50 m×50 m area with one AP.

The disclosed EasiTrack is an indoor tracking system that achieves sub-meter accuracy, scales to massive buildings with (almost) zero costs. EasiTrack also contributes a CSI-based distance estimation algorithm and a map-augmented tracking algorithm, each could separately benefit existing techniques.

FIG. 1 shows an overall architecture where EasiTrack passively collects CSI from one AP and records inertial sensors built in mobile clients. It first calculates the moving distance from CSI by leveraging rich multipaths, and orientation from IMU. Then it fuses the two types of estimates to continuously track, in combination with an indoor map. By this architecture, EasiTrack works like an "indoor GPS" (but without the need of multiple "satellites") that supports large populations of clients. FIG. 1 depicts an overview of EasiTrack's architecture. The left part illustrates the satellite-like protocol of EasiTrack. In an example usage scenario, a client, which could be a mobile, wearable, robot, automated guided vehicle (AGV), or any other electronic equipped with a WiFi radio and inertial sensors (IMU), passively listens to an AP and measures CSI from the incoming packets. The client also reads its built-in inertial sensors. EasiTrack's core engine, running on the client, infers the moving distance and orientation from the measurements and incorporates them together to track the client's continuous locations. The AP is simple: It does nothing but periodically sending signals that could be detected by the clients. Such simple-core, complex-edge architecture design provides significant benefits: 1) Scalable: It allows concurrent positioning of a large population of clients, without affecting the channel capacity; 2) Privacy: It preserves user privacy because the client does not need to send out any signal which may expose its presence, thereby preventing others from sniffing its location; 3) Flexible: The clients could perform different tracking algorithms as needed, all under the same environments. The right part of FIG. 1 shows EasiTrack's work flow on a mobile client. There are two key modules: Distance Estimation and Map-Augmented Tracking.

Distance estimation: EasiTrack involves two distinct approaches, namely Antenna Alignment (AA) and Focusing Ball (FB), to estimate the moving distance traversed by the user. Both approaches leverage the rich multipaths to estimate moving distances, yet are applicable in different tracking scenarios: AA is highly accurate and is suitable for tracking of objects like shopping carts, robots, and industrial AGVs with relatively constrained motions; while FB is less accurate compared to AA, yet it is more generic and is superior for unconstrained human tracking. EasiTrack system, the two approaches can switch as needed on the fly.

Map-augmented tracking: EasiTrack tracks a user's location by fusing the moving distance estimated from CSI and the moving direction measured by inertial sensors. Although the logic flow is similar to conventional dead-reckoning, the present teaching discloses a novel design that incorporates indoor maps for precise tracking in a scalable way. Specifically, EasiTrack takes the indoor map as input and transforms it into a weighted graph. The output graph is then fed into a novel Graph-based Particle Filter (GPF), which leverages the geometric constraints imposed by the map and jointly learns the accurate 2D location and orientation of a target when it moves. The location estimates are then displayed to users together with the map. Since the disclosed GPF only uses an ordinary indoor map (e.g., an image of the floorplan), it can easily scale to massive buildings with few costs.

Precise estimation of moving distance of a device has been a major bottleneck in indoor tracking and inertial sensing, Previously, IMUs have been widely exploited in the way of multiplying step count by stride lengths. This category of approaches, however, are well known to yield huge errors since stride lengths are difficult to estimate and vary significantly over time and subjects. This present teaching discloses two different approaches that can estimate incremental displacement of a moving device by leveraging rich multipaths indoors.

Figure 2:
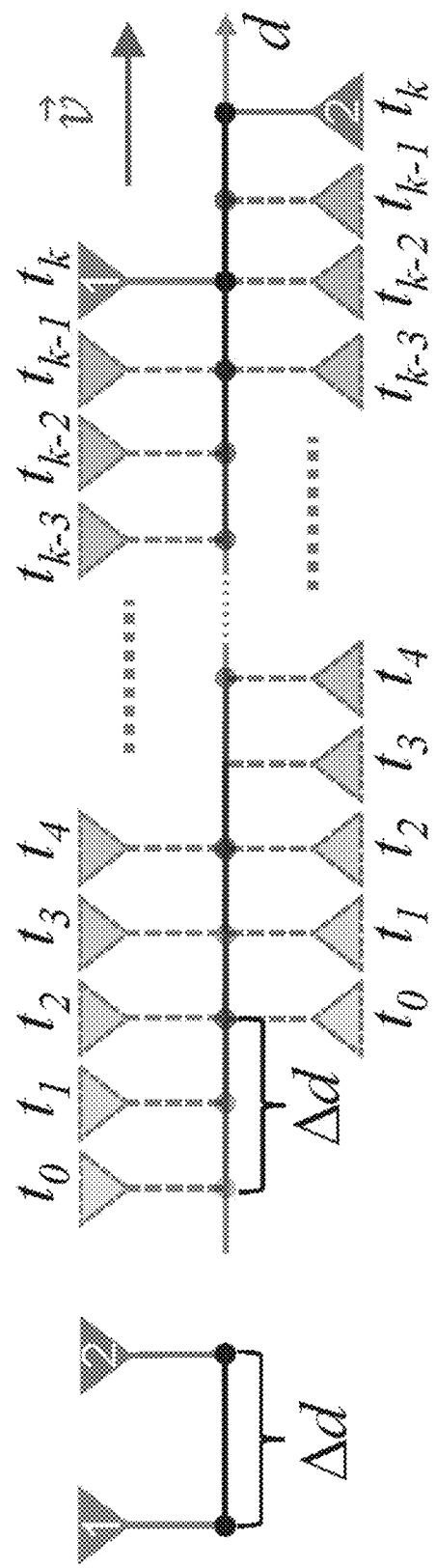
FIG. 2 illustrates an exemplary antenna alignment, according to some embodiments of the present disclosure.

The core idea of AA-based distance estimation is shown below. Consider that a two-antenna array is moving along the line joining themselves (the line is called the antenna array line). FIG. 2 illustrates an exemplary antenna alignment, according to some embodiments of the present disclosure. When the array moves, after a displacement of Δd, antenna 1 will arrive at t_2 at a location where antenna 2 was at t_0. Thus the moving speed can be derived as Δd/(t_2−t_0), Similarly, the instantaneous speeds can be estimated for every time point after that, and becomes Δd/(t_k−t_(k−2)) for current moment t_k. For ease of display, antenna 2 is plotted upside down.

As shown in FIG. 2, when the radio moves, one antenna will immediately follow the trajectory of the other. In other words, the two antennas travel through the same spatial locations and thus observe similar (ideally identical) CSI series, one after the other, with certain time delays Δt. Evidently, during Δt, the array has traveled for a distance of Δd, which equals to the antenna separation. Δd is fixed and known for a given array. Thus if one can estimate the precise time delay Δt, one will obtain the accurate speed estimate as v=Δd/Δt. By continuously estimating Δt, the real-time speeds along the whole trajectory could be derived. Then the moving distance is directly estimated as d=$\int_0^T v_t dt$, where T is the total traveling time.

The above intuition directly leads to a novel mechanism, named antenna alignment, for moving distance estimation. The key is to determine the accurate time delay Δt, namely the time difference when an antenna arrives at a location traversed by the other antenna (i.e., the two antennas are "aligned"). Due to rich multipaths indoors, the CSI: measured at one location could serve as a distinct location profile. Then the task is equivalent to identifying the precise time difference when one antenna observes the most similar channel measurements with the other. In the following, one can first introduce a similarity metric for CSI and then present an approach to precisely infer the time delays.

Time-reversal resonating strength: EasiTrack employs a similarity metric, the time-reversal resonating strength (TRRS), for two CSI $H_1$ and $H_2$ calculated as follows:

$$\eta(H_1, H_2) = \frac{|H_1^H H_2|^2}{\langle H_1, H_1 \rangle \langle H_2, H_2 \rangle}, \qquad (1)$$

where $*^H$ denotes the conjugate transpose. Evidently, $\eta(H_1, H_2) \in [0,1]$, and it achieves 1 if and only if $H_1 = aH_2$ where $a \neq 0$ is any complex scaling factor. If $H_1$ and $H_2$ are both normalized, then the TRRS becomes the square of their inner product, i.e., $\eta(H_1, H_2) = |H_1^H H_2|^2$. Albeit $\eta$ expresses in unsophisticated form, it serves as an effective measure and has been used for fingerprinting at centimeter accuracy. Time reversal is a physical phenomenon that the energy of a transmitted signal will be focused in both space and time domains when combined with its time-reversed and conjugated counterpart. TRRS was first defined in terms of Channel Impulse Response for location distinction. One can adapt to the equivalent form for Channel Frequency Responses.

To make it more discriminative and robust, one can exploit spatial diversity from multiple transmit antennas. Denote the CSI measured on the ith receive antenna at time t as $H_i(t) = \{H_{i,1}(t), H_{i,2}(t), \ldots, H_{i,S}(t)\}$, where $H_{i,k}(t)$ is the CSI between the ith receive antenna and the kth transmit antenna and S is the transmit antenna count. Then the TRRS between the CSI measured by the ith and jth receive antennas becomes $$\bar{\eta}(H_i(t_i), H_j(t_j)) = \frac{1}{S} \sum_{k=1}^{S} \eta(H_{i,k}(t_i), H_{j,k}(t_j)). \qquad (2)$$

By taking the average, one can gain larger effective bandwidth from multiple transmit antennas for a more reliable similarity measure, but circumvent the need of synchronizing the CSI among them.

Figure 3A:
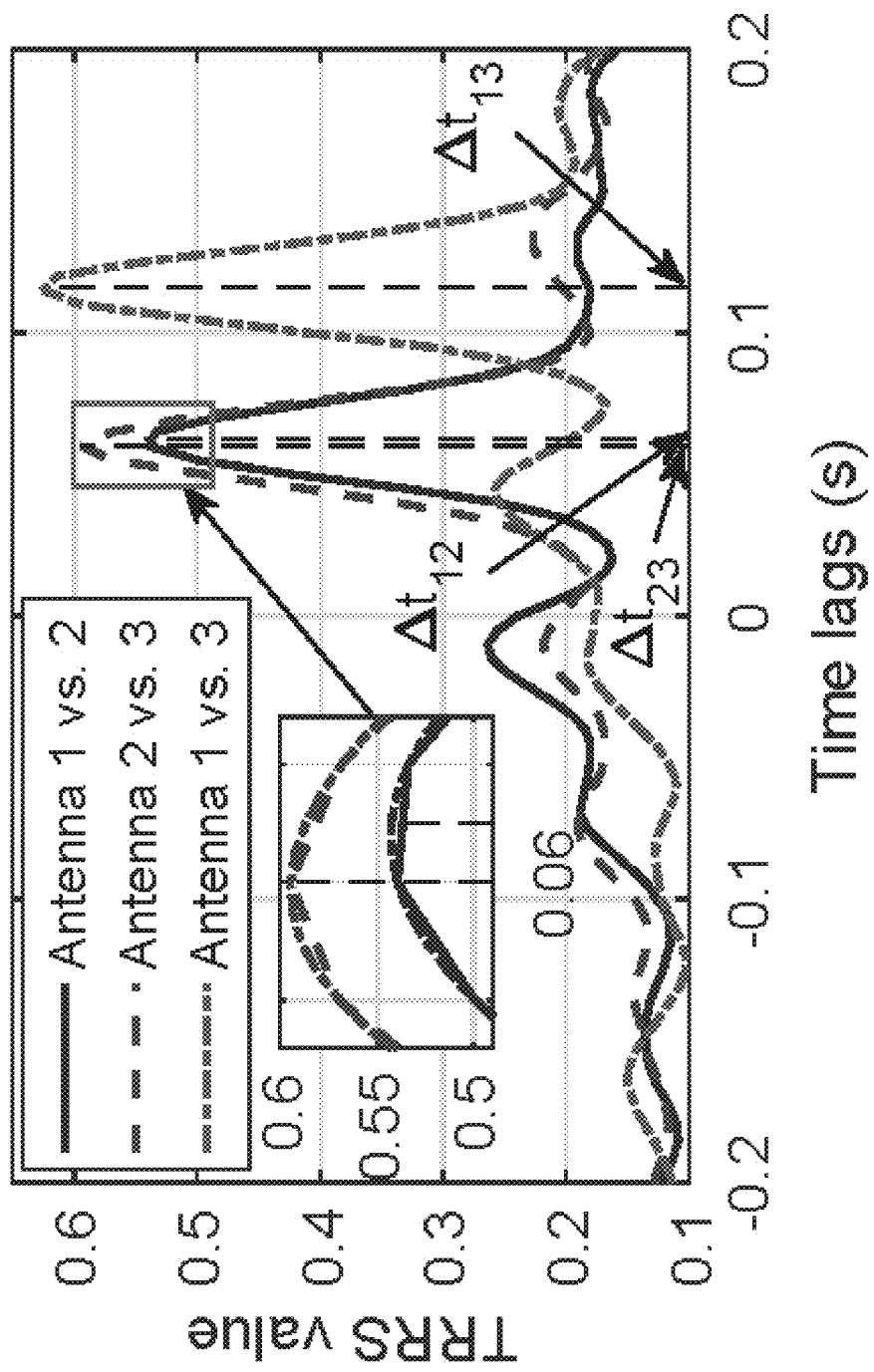
FIG. 3A illustrates an example for estimating time delays from a TRRS matrix, where the maximum TRRSs only appear at a single time point when one antenna presents at a location where the other antenna was Δt time ago with super resolution, according to some embodiments of the present disclosure.

Time delay estimation mechanism: To pinpoint the precise time delay when two antennas i and j are spatially aligned, one can perform a local mapping between the CSI snapshot of antenna i at time t, denoted as $H_i(t)$, against those of antenna j measured within a time window of 2l, denoted as $[H_j(t-l), \ldots, H_j(t), \ldots, H_j(t+l)]$. Ideally, only one specific measurement $H_j(t+\Delta t)$ would produce a very large maximum similarity, indicating that antenna i and j observe the same channel (at the same location), with a time difference of Δt. FIG. 3A shows an example of the TRRS trend $[\eta(H_i(t), H_j(t+k)), k=-l, \ldots, l]$. As seen, one can identify the time delay by looking for the maximum TRRS peak. Formally, one can have $$\Delta t = |\arg\max_{k \in [-l, \cdots, l]} \bar{\eta}(H_i(t_i), H_j(t+k))|. \qquad (3)$$

Figure 3B:
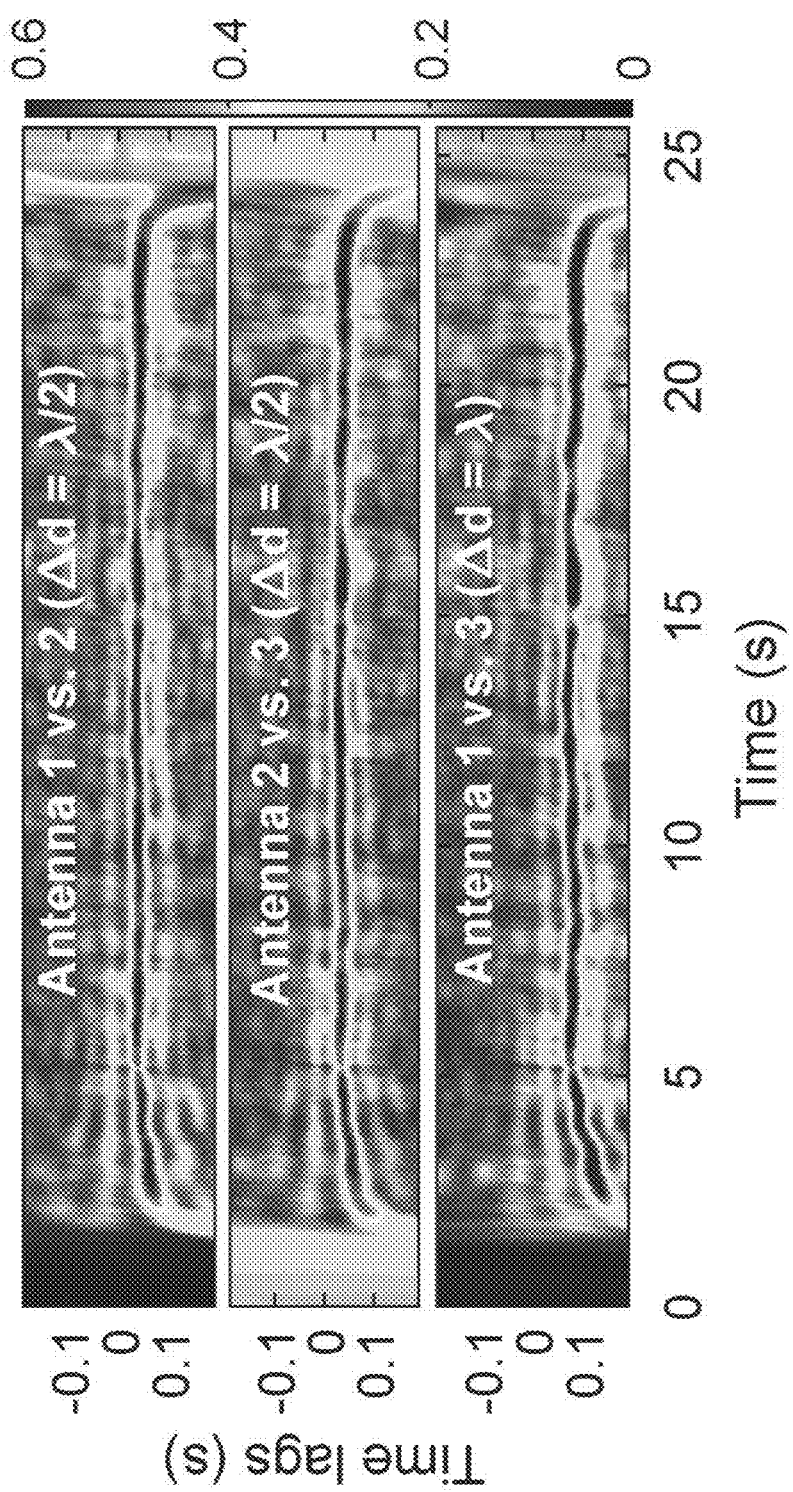
FIG. 3B illustrates an example for estimating time delays from a TRRS matrix for a straight moving trajectory of a three-antenna array, according to some embodiments of the present disclosure.

In practice, two techniques are further employed to enhance the time delay estimation accuracy: First, as shown in FIG. 3A, one can conduct a regression around the TRRS peak area to find a finer-grained time lag, which breaks down the resolution limit by sampling rates. Second, instead of looking at an individual time point, one can consider a TRRS matrix over time (as shown in FIG. 3B), where each column indicates the TRRS trend (as in FIG. 3A) for that specific time point. Based on the TRRS matrix, one can employ dynamic programming to robustly find the continuous TRRS peaks over time.

Although AA involves CSI mapping, it does not need any prior training and is immune to environmental dynamics because the mapping is done in a transient window. In addition, different from fingerprinting that needs to find a best match over all records, EasiTrack is only interested in the relative TRRS trend over a short time window, which allows a higher resolution at sub-centimeter level (FIG. 3A).

Figure 3C:
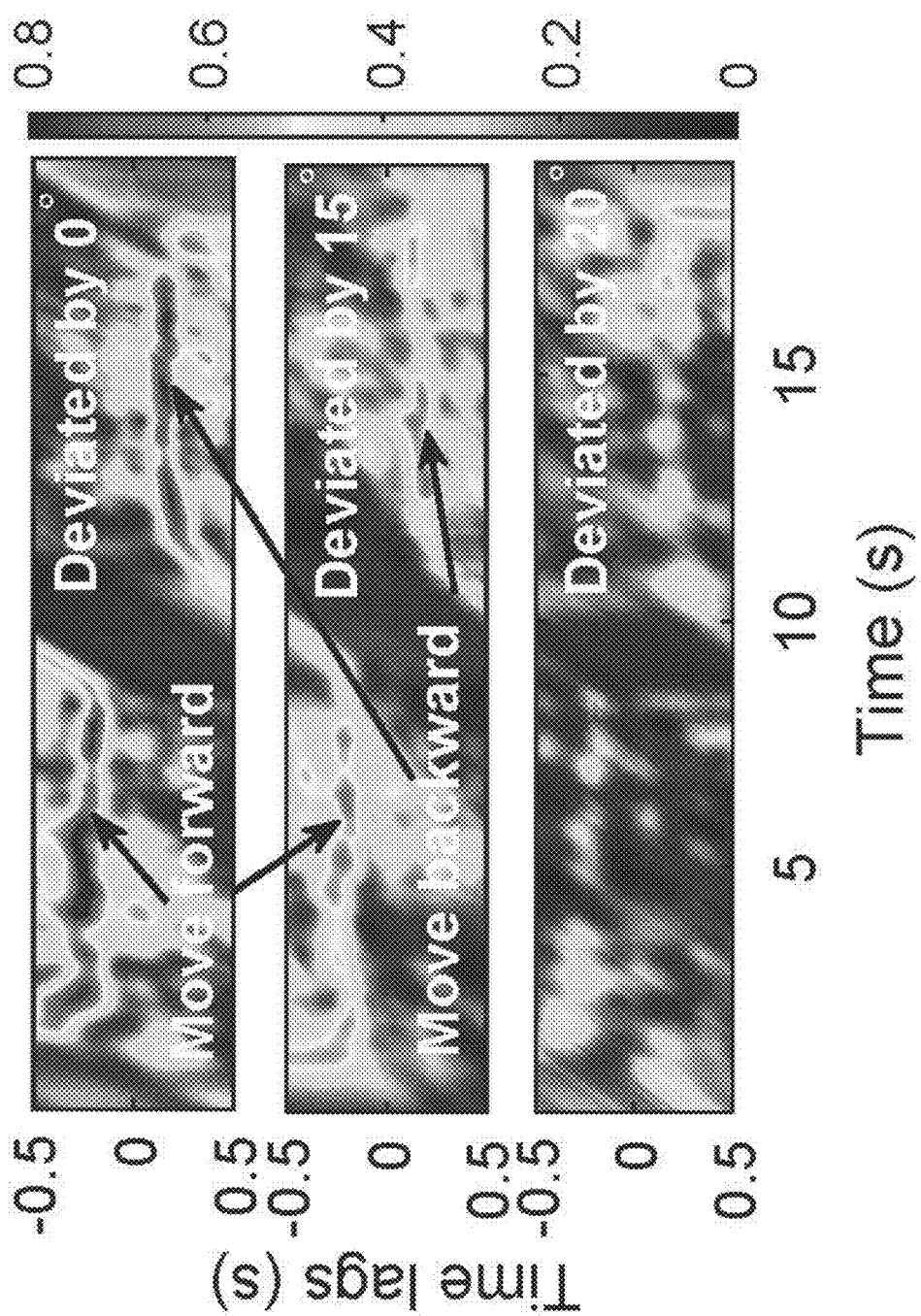
FIG. 3C illustrates an example for estimating time delays from a TRRS matrix, where the TRRS decreases when the device does not move along the antenna array line, yet evident peaks still exist for deviation angles within 15 degree thus allowing speed estimation, according to some embodiments of the present disclosure.

Handling practical movements: In principle, to estimate distance by AA, the target needs to move along the antenna array line, which is impractical to force. Fortunately, the constraint is relaxed in EasiTrack because, again, the relative TRRS trend rather than the absolute TRRS values is considered. FIG. 3C shows an example of the MRS matrix under different deviation angles. As seen therein, if the deviation angle is small, there still exist evident similarity peaks, yet with slightly decreased peak values, which do not affect distance estimation. According to the disclosed experimental measurements, EasiTrack can tolerate a deviation of up to about 15°, when the adjacent antenna separation is 4 cm. This is a crucial feature for practical applications with which one can estimate the moving distance of a target without requiring it to move strictly along the antenna array line, underpinning realistic tracking of targets like robots, AGVs, shopping carts, etc.

AA is unsuitable for human tracking since it is impractical to ask a person carry a device and move it along a line during natural walking, To estimate moving distance for pedestrians, one can incorporate a recently developed method based on focusing ball effect in, where a critical statistical property of indoor RF signal propagation is discovered and modeled: The spatial distribution of multipath profiles, represented by CSI, is subject to a determinate function of spatial separation. This underlies an opportunity to reversely infer the moving distance from the distribution of CSI, whenever the device moves. One can briefly review the main results below and refer readers for more details in.

Consider the TRRS in Eqn. (2.) for two CSI measured by the same receive antenna i at two locations L_0 and L, denoted as H_i (t;L_0) and H_i (t;L). One can have:

$$\eta(H_i(t; L_0), H_i(t; L)) \approx J_0^2\left(\frac{2\pi}{\lambda}d\right), \quad (4)$$

where $\lambda$ is the wavelength, d is the distance between $L_0$ and L, and $J_0(x)$ is the zeroth-order Bessel function of the first kind. From Eqn. (4), one can estimate the moving distance by calculating the TRRS distribution for one CSI and the subsequent measurements on the receiver.

Comparing with AA, the accuracy of FB for distance estimation will be lower because the TRRS measurements may slightly deviate the theoretical distribution in practice due to non-uniformity of multipath distribution. The FB method is superior in its independence of moving directions and locations, since the property arises from the nature of numerous indoor multipaths. As a result, it is favorable for human tracking and employed in EasiTrack for this purpose. A key feature of both approaches is that, different from prior systems that attempt to resolve and combat multipaths for tracking, EasiTrack distinctively leverages numerous multipaths together: the more multipaths there are, the better performance it achieves. As a result, one can estimate distances independently from many factors, including location, orientation, environment, etc.

In addition to moving distance, EasiTrack also needs the moving direction to continuously track a target. EasiTrack utilizes the ubiquitous inertial sensors and follows standard operations to derive orientation information. In particular, one can mainly employ the gyroscope to measure the turning angles and accumulate the measurements to infer the current heading direction. Aiming at 2D movements, one can project the gyroscope readings based on the device's local coordinate system onto the gravity direction, which can be inferred from the accelerometer before the device starts moving. By such, the device can be in any position and does not need to be placed horizontally.

Inertial sensors are also leveraged to detect movements, and further determine if the target is making a turn or not, which will be used later in tracking.

Intuitively, the locations can be directly calculated by integrating the consecutive measurements of moving distance and orientation, in a manner similar to dead-reckoning. This approach, however, suffers from significant errors due to the erroneous orientation measured by inertial sensors.

In EasiTrack, indoor maps are incorporated to achieve precise tracking with coarse-grained orientation and distance observations. Two opportunities inspire the disclosed design: First, indoor maps impose effective geometric constraints to target's movements. Second, digital maps are nowadays ubiquitously available. In particular, industry efforts have been carried out to calibrate indoor maps for public places. Research advances have also promoted automatic generation of digital maps via mobile crowd sourcing.

While road maps are used to correct GPS errors, the present teaching leverages indoor maps in a lightweight and scalable way. Specifically, one can devise a graph-based particle filter based on a novel graph-based representation of indoor map. The graphical representation before diving deep into the disclosed GPF is shown in the following.

One can take standard indoor map, in the form of a plain image, as input. This does not request structured information, e.g., the knowledge of walls, corridors, and rooms, which is difficult to obtain from the map. Instead, one can merely extract access information that tells whether a location (a pixel) is accessible or not. Hence, the map can be, for example, a simple image with a specific color indicating inaccessible pixels (e.g., black walls), the most typical form for indoor maps.

Figure 4A:
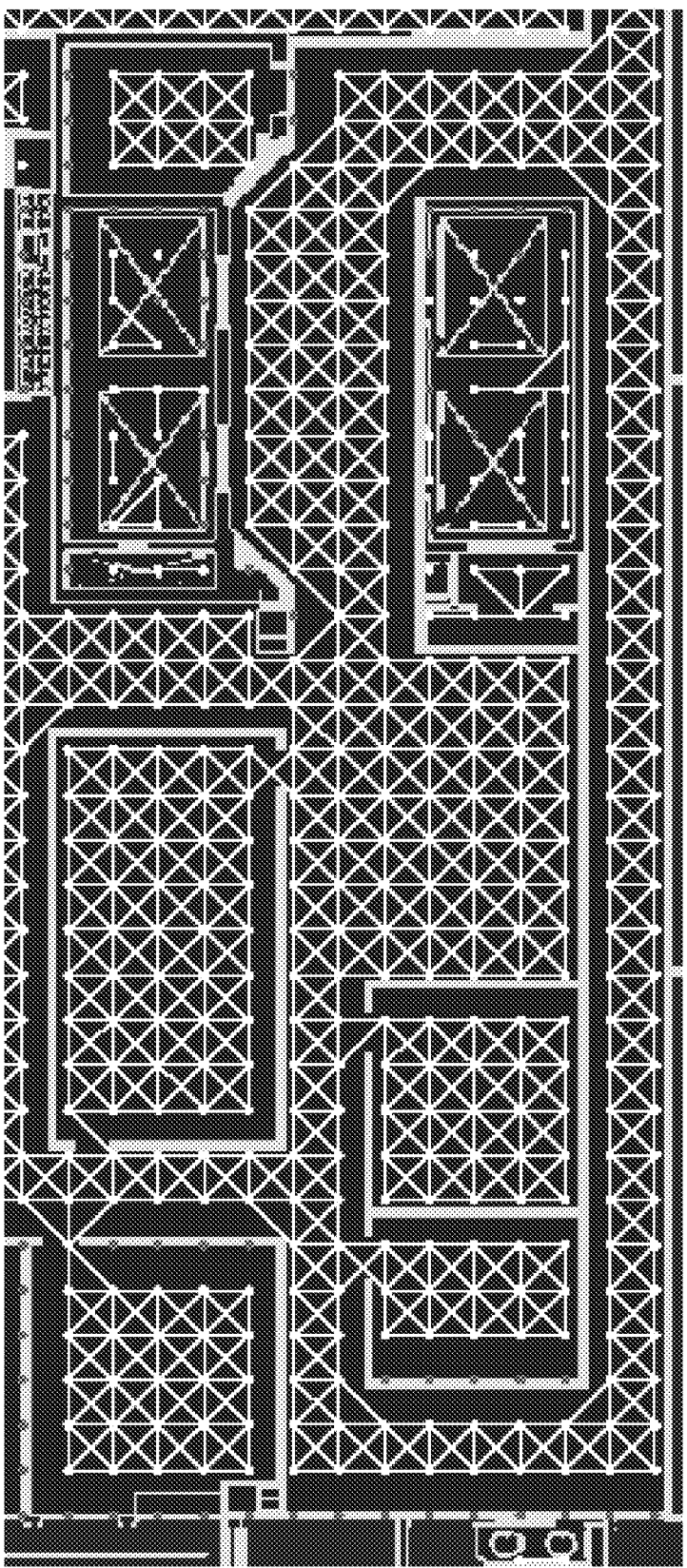
FIGS. 4A-4B illustrate exemplary graph-based map representations, according to some embodiments of the present disclosure.

Map discretization: To reduce the computation complexity and achieve real-time tracking, one can transform the map into a weighted graph. One may first sample the space (i.e., map) by a set of uniformly distributed points with a certain grid size s, each point becoming a vertex. Every vertex could be accessible or inaccessible, depending on its location on the map (i.e., pixel in the image). Then one may add edges between a vertex and each of its adjacent vertexes, if the edge does not intersect any obstacles. Each edge is weighted by its physical distance between two vertexes (which is either s or $\sqrt{2}$s under grid sampling). By doing such, one may build a weighted graph G=(V,E), as shown in FIG. 4A. The sampling density s trades off the grid resolution and the number of vertexes. To target at sub-meter accuracy, s should be below 1 m and adapts to different maps. FIGS. 35A-35B illustrate exemplary graph-based map representations, according to some embodiments of the present disclosure. For clarity, only a partial map is displayed.

Figure 4B:
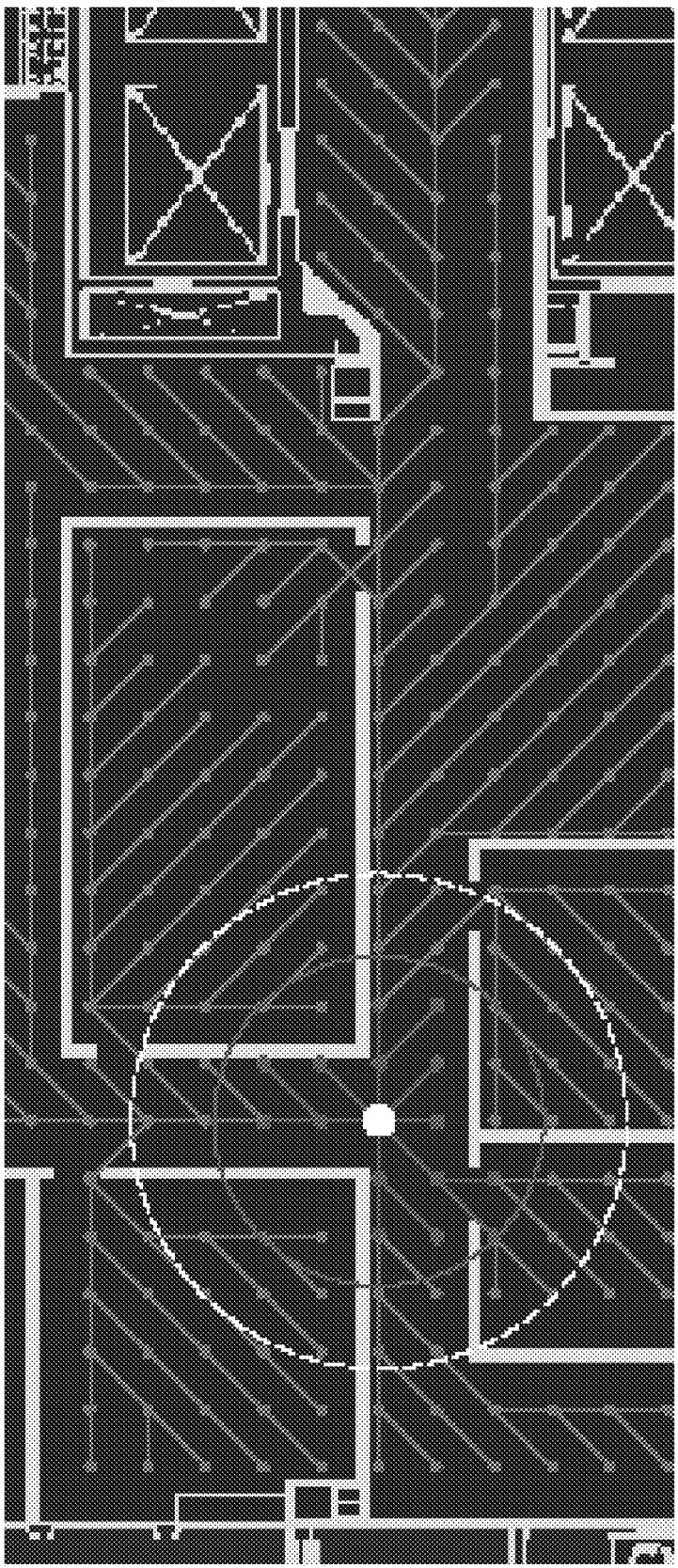

Reachability matrix: Once having transformed a map into a weighted graph, one can extract the intrinsic geometric properties by generating a reachability matrix M to represent the pair-wise reachable distances of |V| vertexes. Each element m_ij of the matrix denotes the reachable distance between vertexes V_i and V_j, which is defined as their shortest path distance, m_ij will become an infinite value if there does not exist an unobstructed path between V_i and V_j. FIG. 4B illustrates an example of reachability for one vertex, which basically shows all the shortest paths starting from it to all other vertexes.

The reachable distance is different from the Euclidean distance, but rather the walking distance between two locations. In fact, the reachable distance is usually larger than the Euclidean distance, because the straight line joining two locations is frequently blocked indoors. To avoid too huge size of M in case of large tracking areas, in practice one may ignore too distant vertex pairs and make M a rather sparse matrix. For example, only elements m_ij≤10 m will be stored.

How to design and implement an augmented particle filter by leveraging the graphical map is shown below with the pre-processed results. One may employ N particles, X= $(X^{(1)}, X^{(2)}, \ldots, X^{(N)})$, with a three dimensional joint probability distribution. Each particle is represented as $X^{(i)}=(x^{(i)}, y^{(i)}, \theta^{(i)})$, where $(x^{(i)}, y^{(i)})$ denotes its 2D location and $\theta^{(i)}$ is the orientation of the ith particl.

Particle Movement: For the motion measurement $(\Delta d_t, \theta_t)$ at time t, the ith particle is updated as $$x_t^{(i)}=x_{t-1}^{(i)}+(\Delta d_t+\delta^{(i)})\cos(\theta_t+\alpha^{(i)}), y_t^{(i)}=y_{t-1}^{(i)}+(\Delta d_t+\delta^{(i)})\sin(\theta_t+\alpha^{(i)}) \quad (5)$$

where $\delta^{(i)}$ and $\alpha^{(i)}$ are the Gaussian random noises added to the moving distance and orientation measurements, respectively.

Particle Weighting: Initially each particle gets an equal weight of $w_0^{(i)}=1/N$. At every step, particles undergo two weighting assignment: 1) Any particle that hits any inaccessible area (typically the walls) during a move will "die" and gets eliminated; 2) All other particles survive and will be weighted based on the distance-to-live (DTL) defined as below.

The key idea to determine a particle's weight, without the help of any additional measurements from extra signal sources, is that a particle should get a larger weight if it is more likely to survive for a longer distance before it is going to hit some obstacles, and otherwise a smaller weight. This insight directly leads to the specification of DTL.

Figure 5:
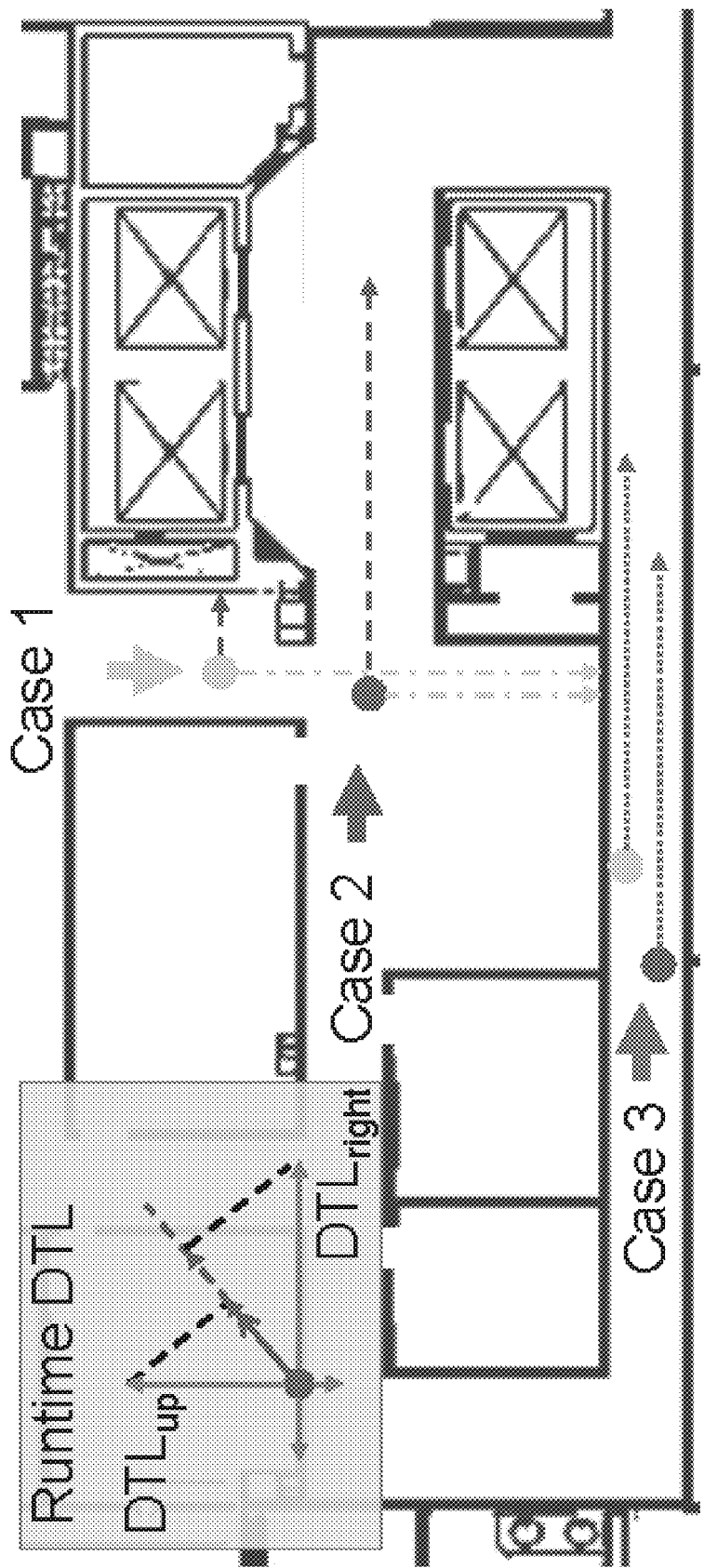
FIG. 5 illustrates DTL examples, according to some embodiments of the present disclosure.

FIG. 5 illustrates DTL examples, according to some embodiments of the present disclosure. In case 1, the particle in light shadow has larger DTL than the one in dark shadow. In case 2, when the particles are moving towards right, the dark one gets larger weight. In case 3, both particles hold very large DTLs, which are thus forced to a fixed max-DTL value. In runtime, the MT is approximated from the pre-calculated DTLs along four basic directions.

As shown in FIG. 5, the for a particle is calculated as the maximum accessible distance from the particle position along the particle moving direction. In case of very long corridors, one may set a maximum DTL to avoid overlarge values (Case 3 in FIG. 5).

In principle, the DTL needs to be calculated for every particle at every step, which is, however, too costly. In the disclosed GPF, one may devise an efficient approximation. During the pre-processing stage, one may additionally calculate the DTLs in four basic directions (i.e., left, right, up, and down) advance. Then the DTL along a certain direction θ can be accordingly calculated as the sum of the projection of the DTLs along the two closest basic directions (e.g., right and up for the example in FIG. 5) on the current moving direction. Albeit the resulted DTLs are not necessarily equal to the exact DTLs by definition, one may demonstrate in real system that such approximation is effective and efficient. The main reason behind is that only the relative ranking of particle weights, rather than the absolute values, matter in the GPF. The above operation retains similar weight ranking as the exact DTLs, yet significantly reduces the runtime complexity.

Resampling: The disclosed GPF implements a novel approach for resampling. It first resamples N_live particles from the importance distribution, interpreted by particle weights $\{w_t^{(i)}|i=1,2, \ldots, N_{live}\}$, by following classical sequential importance resampling approach. Here denotes the number of surviving particles during the current step. However, for each dead (thus eliminated) particle, one may choose to regenerate, instead of resampling, a new particle to avoid sample impoverishment problem (particles being over concentrated).

As shown in FIG. 4B, one may consider a certain neighboring area centered at the target's current location for regeneration. Supposing the target is currently at (x_t,y_t) closest to vertex V_t, one may first gather all of its reachable vertexes V_j with a reachable distance m_tj≤r and calculate each of their DTLs based on the current moving direction. Then one may perform importance sampling to draw N-N_live new particles among these candidate locations, using their DTLs as importance distribution. As shown in FIG. 4B, the regeneration radius r dynamically increases (white circle) when the target is detected to be turning and decreases otherwise (green circle).

Target location estimation: Finally, at each step, one may estimate the target's location using information of all the particles. Intuitively, the target location can be determined as the weighted centroid of all particles' locations. However, the centroid may be an inaccessible location or the line joining it to the current location may intersect a wall. Therefore, in EasiTrack, one may resort to a similar concept of medoid. In general, a medoid is a representative within a data set whose average dissimilarity to all the objects in the set is minimal. Compared with centroid, using medoid ensures that the resulted target location is always valid. Formally, the target location is estimated as the location of particle where $$p^a = \arg\min_{i \in \{1,\ldots,N_{live}\}} \sum_{j=1}^{N_{live}} \frac{\phi(x_t^{(i)}, x_t^{(j)})}{w_t^{(j)}} \tilde{\jmath} 1/4CE \quad (6)$$

where $\varphi(X_t^{(i)}, X_t^{(j)})$ denotes the Euclidean distance between the two particles' locations. Then the series of location estimates are smoothed and displayed to users.

Gyroscope is known to suffer from significant accumulative errors. As reported by a latest work, the error can accumulate to above 50° after 2 minutes of running. According to the disclosed experimental experience, it could produce over 30° errors for a single 90° natural turning. These considerable errors in orientation, if not calibrated, will lead to significant location errors that even the GPF fails to correct because all particles will be guided to move in wrong directions.

To eliminate the accumulative errors, one may devise a technique to automatically reset the orientation opportunistically. The key observation is that, when the target is moving along a roughly straight path but not making a turn, the moving trajectory during this non-turning period offers a useful hint to infer the current heading direction. EasiTrack leverages these hints and performs opportunistic moving direction recalibration. Specifically, once such a non-turning segment is detected, one may reset the current moving direction by estimating the center line direction of the straight segment. For common behaviors, the target is moving straight rather than turning most of the time. Thus one can employ the reset operation quite frequently. By continuous recalibration, the accumulative direction errors will be effectively mitigated, even over very long running.

As EasiTrack only measures moving distances and directions, it needs a global location to initiate. Technically, the particle filter is capable of determining the initial location by initializing uniformly over all possible locations. However, it is only feasible with a huge number of particles, which is computationally prohibitive in practice especially for very large tracking areas. Moreover, the particles only progressively converge after a long time, and sometimes do not converge.

Considering a real application and system, a promising alternative is to leverage the last-seen GPS signals at building entrances, as well as to request manual inputs from end users. One can mainly use user manual inputs in current EasiTrack system, since the primary goal is to demonstrate the disclosed distance estimation and map enhancement techniques. Although these technologies may not offer initial location at high accuracy, the caused errors will later be overcome by the disclosed GPF.

For implementation, one can build a fully functional real-time system of EasiTrack, which involves many implementation details.

CSI denoising: CSI measured on COTS WiFi contains phase offsets, such as carrier frequency offset (CFO), sampling frequency offset (SFO), and symbol timing offset (STO), in addition to initial phase offset caused by the phase locked loops. EasiTrack is immune to the annoying initial phase distortions, which can only be manually calibrated previously, e.g. by taking the absolute value in Eqn. (1). One can calibrate the other linear offsets by using the phase cleaning approach.

integrating multiple receive antennas: The disclosed AA method may need a minimum of two antennas as an array. In the disclosed implementation, the WiFi chipsets have three antennas. To fully utilize them, one can arrange them in a uniformly spaced linear array. Then one can treat the 1st and 2nd antennas as a pair, and the 2nd and the 3rd as another pair, and integrate the results together. The FB method works with a single antenna, yet one can also fuse the TRRS of all receive antennas to facilitate distance estimation.

Movement detection: One can employ inertial sensors to determine whether the target is moving. Only when the device is detected to move will EasiTrack estimate the moving distance. To mitigate the interference of irrelevant movement (e.g., hand motions) in human tracking, one can additionally apply a mask to detect if a user is walking or not by detecting steps using IMU.

Tracking in very large areas: EasiTrack uses a single AP to achieve ubiquitous tracking with a remarkable coverage. Technically, it works in any place covered by the AP, regardless of LOS or NLOS conditions. In practice, one single AP may not be sufficient to fully cover a very large tracking area. In such situation, multiple APs are required to provide full coverage. Accordingly, EasiTrack needs to handle handover between different APs when the client roams about the space, although it always uses only one AP at one time for tracking, One can use a straight-forward RSS-based handover scheme in the disclosed implementation for this purpose.

Map pre-processing: EasiTrack needs merely information on accessible and inaccessible areas from the ordinary images of indoor floorplans. This information could be automatically recognized by pixel colors. For example, the walls may be marked in darker colors while open spaces are black and white (or vice versa). However, depending on the quality of the obtained map image, there might be some interferences (e.g., texts, dimensions, etc.) that affect automatic recognition. To cope with that, one may manually pre-process the map to highlight all the obstacles (mainly walls) with a specific color. In one embodiment, it takes about 10 minutes for one who knows basic operations of Photoshop to process a typical map.

One can evaluate the disclosed system in real world scenarios using COTS WiFi. One can then deploy EasiTrack in 5 different buildings to evaluate human and cart tracking and 2 industry manufacturing facilities to test AGV tracking.

Methods: One can first evaluate the accuracy and impacting factors of the disclosed distance estimation method, AA, and compare with FB. To do so, one can put the EasiTracker on a cart and move it roughly along a straight line. One can evaluate different traces of about 10 m long and perform both AA and FB on the collected CSI respectively. One can set up a camera to capture the ground truth moving distances.

Figure 6:
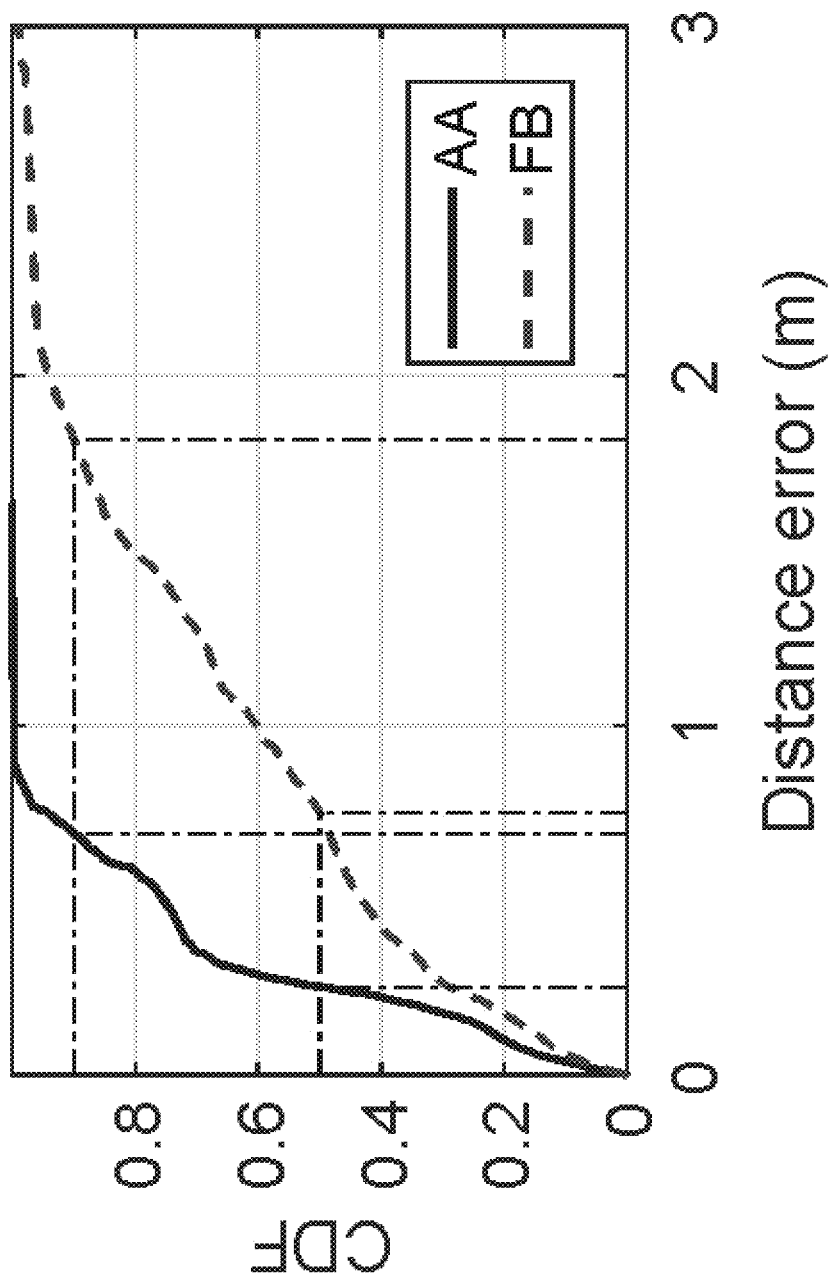
FIG. 6 shows an exemplary comparison of two distance estimation methods, according to some embodiments of the present disclosure.

Overall accuracy: FIG. 6 compares the overall performance of AA and FB on moving distance estimation. As seen, AA achieves a remarkable median error of about 0.25 m and 90% tile error of 0.69 m, while FB yields 0.75 m and 1.82 m errors, respectively. Although the performance gains of AA come at the cost of relatively constrained movements, AA opens up a wide range of exciting opportunities due to the high accuracy, especially for tracking machines and objects like AGVs, shopping carts, robots, etc. Several factors that may impact AA's performance are studied. The impacting factors of FB method have been extensively studied. Thus one may only evaluate the overall tracking performance when incorporating it in EasiTrack.

Sampling rate: Certain sampling rates will be needed by EasiTrack to ensure enough resolution in distance estimation; otherwise the peak resolution (recall FIG. 3A) is limited. The results show that a sampling rate of 200 Hz, which one can use in EasiTrack, is adequate for normal speeds up to 2 m/s.

Figure 7:
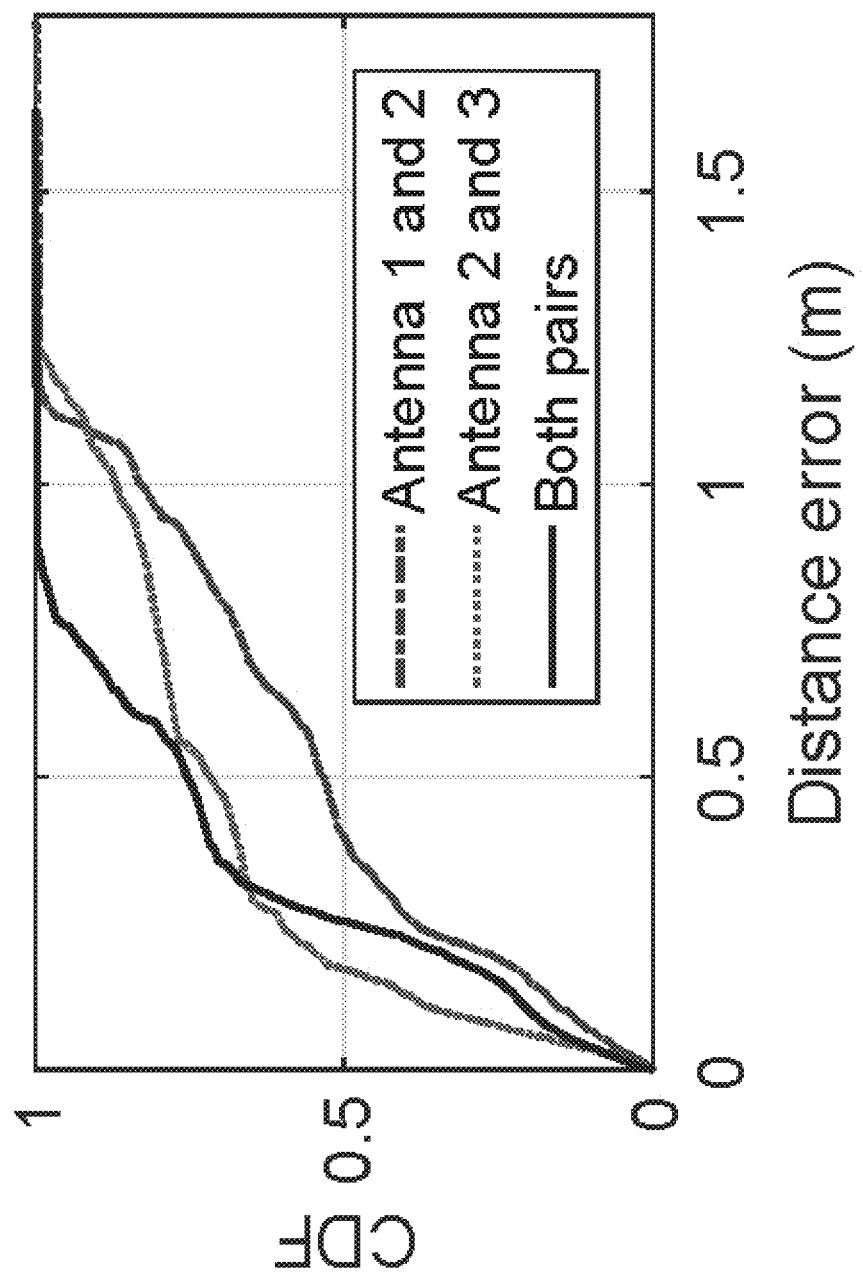
FIG. 7 shows an exemplary performance of Antenna Alignment distance estimation method with respect to different antenna pairs, according to some embodiments of the present disclosure.
Figure 8:
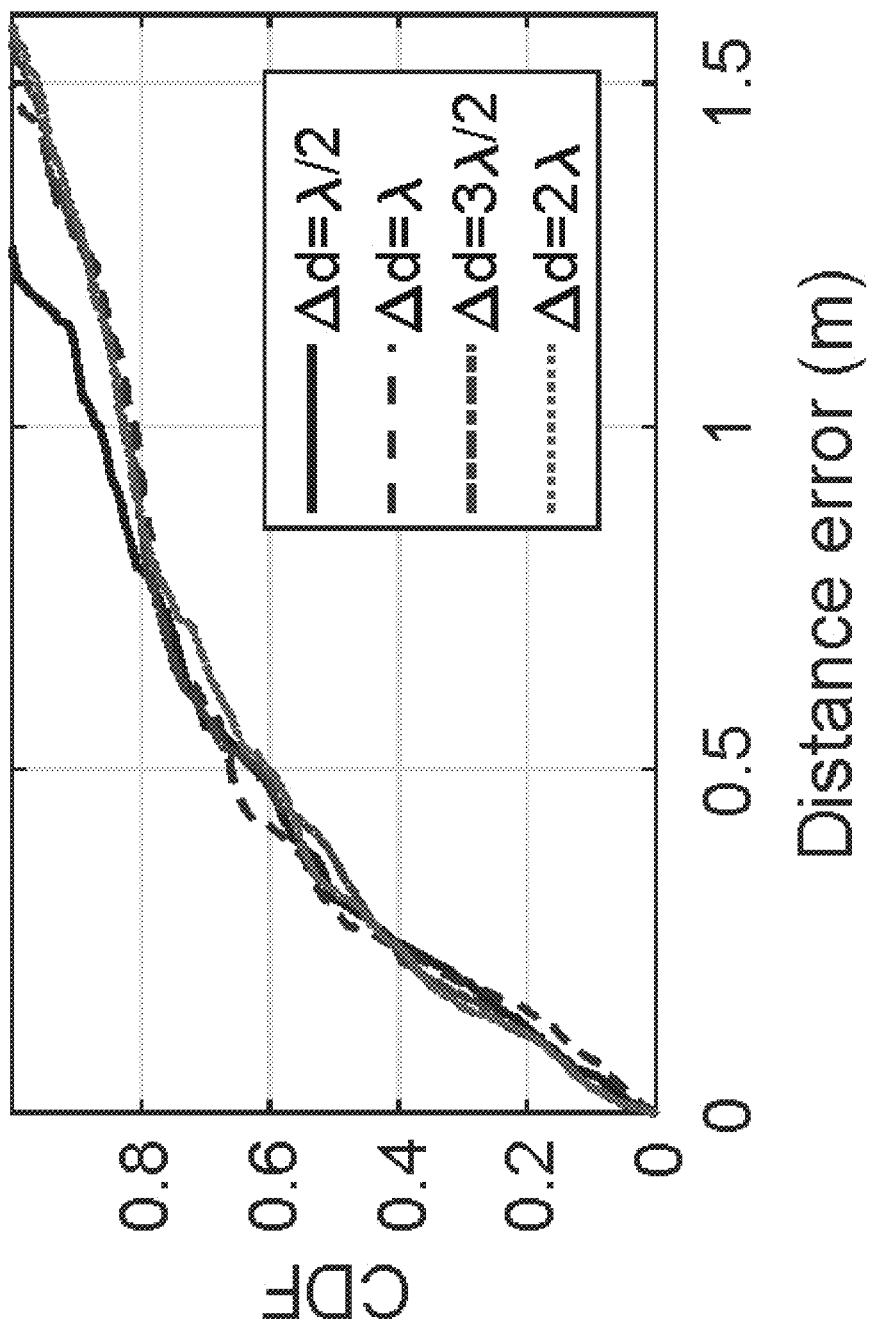
FIG. 8 shows an exemplary performance of Antenna Alignment distance estimation method with respect to different antenna separations, according to some embodiments of the present disclosure.

Antenna diversity and separation: FIG. 7 shows the diversity of antenna pairs. One can test different combinations of the three antennas available on the disclosed device as well as fuse two pairs together. As seen, AA produces consistently high performance using different antenna pairs and improves when combining multiple pairs, One can also examine different antenna separations, ranging from $\lambda/2$, $\lambda$, $3\lambda/2$ to $2\lambda$. As shown in FIG. 8, different separations only see negligible differences. Yet as a rule of thumb, the separation should be larger than $\lambda/2$; otherwise coupling effects will come into play.

Methods: Now one can study the tracking performance of EasiTrack system. One can deploy the system in one floor of a typical office building. There are rooms separated by dry walls, concrete pillars, and elevators inside the floor. One can place the AP in the middle of the building to provide good coverage. The AP may work on 153 channels. There are normal WiFi traffics on the same and adjacent channels. During experiments, there are people working around.

For AA-based EasiTrack (EasiTrack—AA), one can place the device on a cart and push it around. While for FB-based (EasiTrack—FB), one can ask a human to hold the device in hand and walk naturally. To study the quantitative location errors, one can mark a set of checkpoints at a density of about every two meters. The ground truth is record when a user passes by a checkpoint. Then one can employ several users to walk (or push a cart) around different areas. Multiple users can be tracked in the same time, regardless that they are testing EasiTrack-AA or EasiTrack-FB. Due to budget constraints, one can build three tracking kits (each including a Galileo Gen2 board and a Surface Pro), although EasiTrack can support any amount. The results are then categorized to evaluate the two methods respectively.

Figure 9:
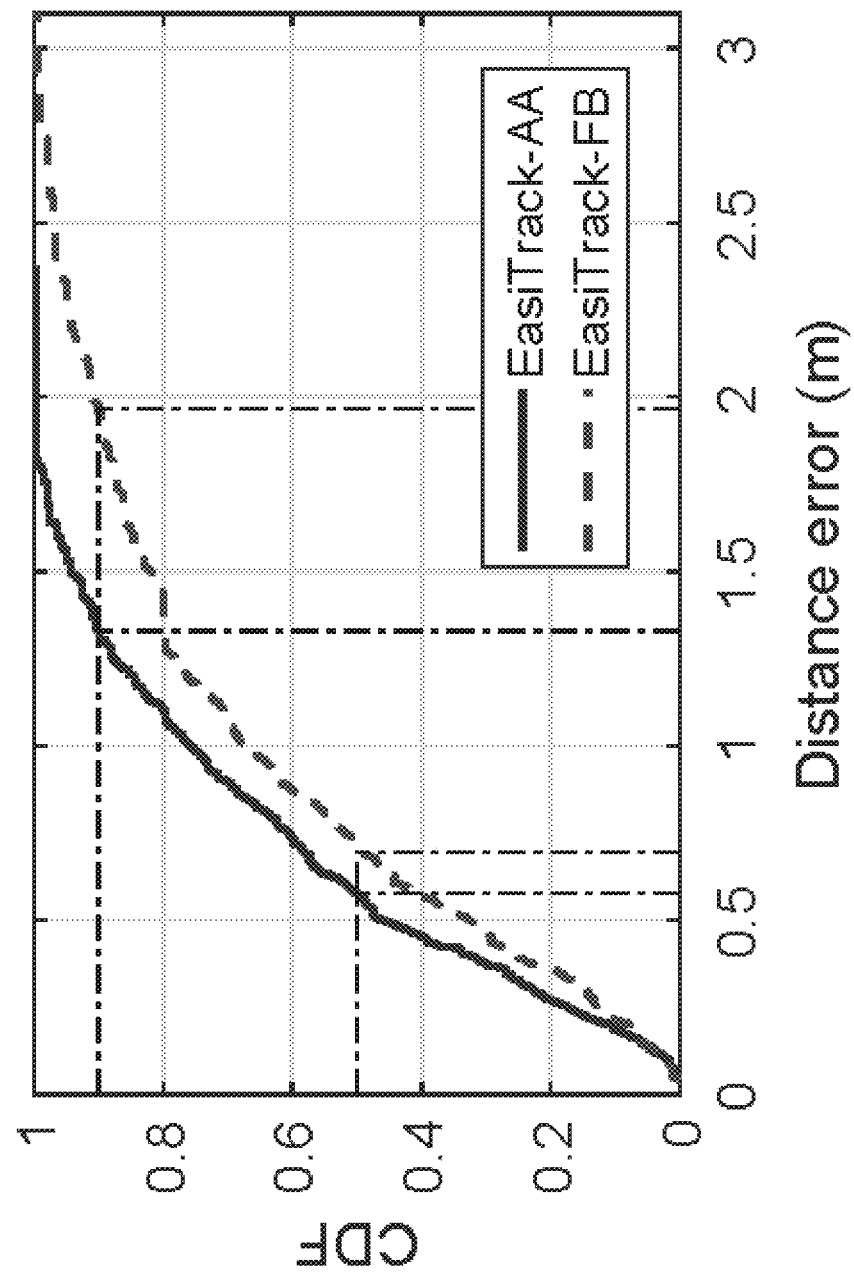
FIG. 9 shows an overall tracking accuracy performance of distance estimation methods, according to some embodiments of the present disclosure.

Overall performance: FIG. 9 shows that both EasiTrack-AA and EasiTrack-FB achieve sub-meter median accuracy. Specifically, EasiTrack-AA yields a median 0.58 m and 90% tile 1.33 m error respectively for cart tracking. Surprisingly, EasiTrack-FB achieves only slightly worse performance for human tracking with a median error of about 0.70 m, and a 90% tile error of 1.97 m. Compared to the distance estimation accuracy in FIG. 6, the overall tracking accuracy of EasiTrack-AA is slightly lower, which is mainly limited by orientation errors arising from sensors. In contrast, the accuracy of EasiTrack-FB improves a lot, contributed by the disclosed GPF, which effectively corrects location errors with a map.

Impacts of particle number: A unique feature of EasiTrack is that it achieves great performance using a small number of particles, thanks to the graph-based model. One can investigate how the performance would change with respect to particle amounts. One can thus evaluate the performance with particle numbers ranging from 20 to 800. EasiTrack achieves considerable performance with only 100 particles. The results show that EasiTrack requires orders of magnitude less particles than existing approaches. In one embodiment, 20 particles may be too few and may lead to very large tail errors, especially for EasiTrack -FB. In practice, a minimum of 50 particles is recommended.

Impact of errors in initial location: As the disclosed current implementation uses manual inputs for initial location, it is interesting to examine how sensitive it is to the uncertainties in initial location. One can add random errors to the start point, from 0.5 m to 2 in, and evaluate the traces with the erroneous initial locations. The disclosed GPF responsively overcomes these errors and maintains similar performance, which only slightly degrades to a median 0.73 in and 90% tile 1.56 m error for EasiTrack-AA when there are 2 m errors in initial locations. In other words, EasiTrack does not rely on precise initial locations to start. Instead, it only needs a coarse-grained input, which again could be provided by the user, opportunistic GPS, or other available anchors.

Benefits of direction reset: One can individually study the benefits of direction reset module. To do so, one can rerun all the traces offline by disabling the direction reset feature, and compare the results. It turns out that large errors are remarkably reduced for EasiTrack-FB, with a 90% tile error of 3.1 m to 1.7 m, by automatic direction reset, which eliminates large accumulative direction errors caused by sensors. For EasiTrack-AA, it achieves marginal accuracy gains. The reason is that direction error is less significant than human walking when placing the device on a cart. When direction errors accumulate, direction set will take effect.

Coverage: The disclosed benchmark evaluation demonstrates EasiTrack's tracking coverage in a typical office of 36 m×22 m. To stress the disclosed system to show the coverage limit, one can test tracking in a large building of about 100 m×35 m with many concrete walls and pillars, where one AP is not sufficient to cover the entire floor and thereby one can test tracking with handover between two APs. One can place two APs at two diagonal corners of the building; each roughly covers half of the tracking areas. The results validate that EasiTrack roams smoothly between the two APs and achieves similar high accuracy under either AP's coverage, as well as in the overlapping areas (middle corridors), thereby allowing it to track in very large areas simply by setting up additional APs.

To verify the tracking accuracy and deployment simplicity of EasiTrack, one can carry out real-world deployment at multiple sites with two different scenarios considered: human tracking and AGV tracking. Both cases have shown good tracking performance. EasiTrack runs in real-time without perceivable delays to end users. One may be interested in the system complexity introduced by different modules, especially distance estimation and the GIF. It is verified that EasiTrack can run in real-time even on small embedded devices.

Figure 10:
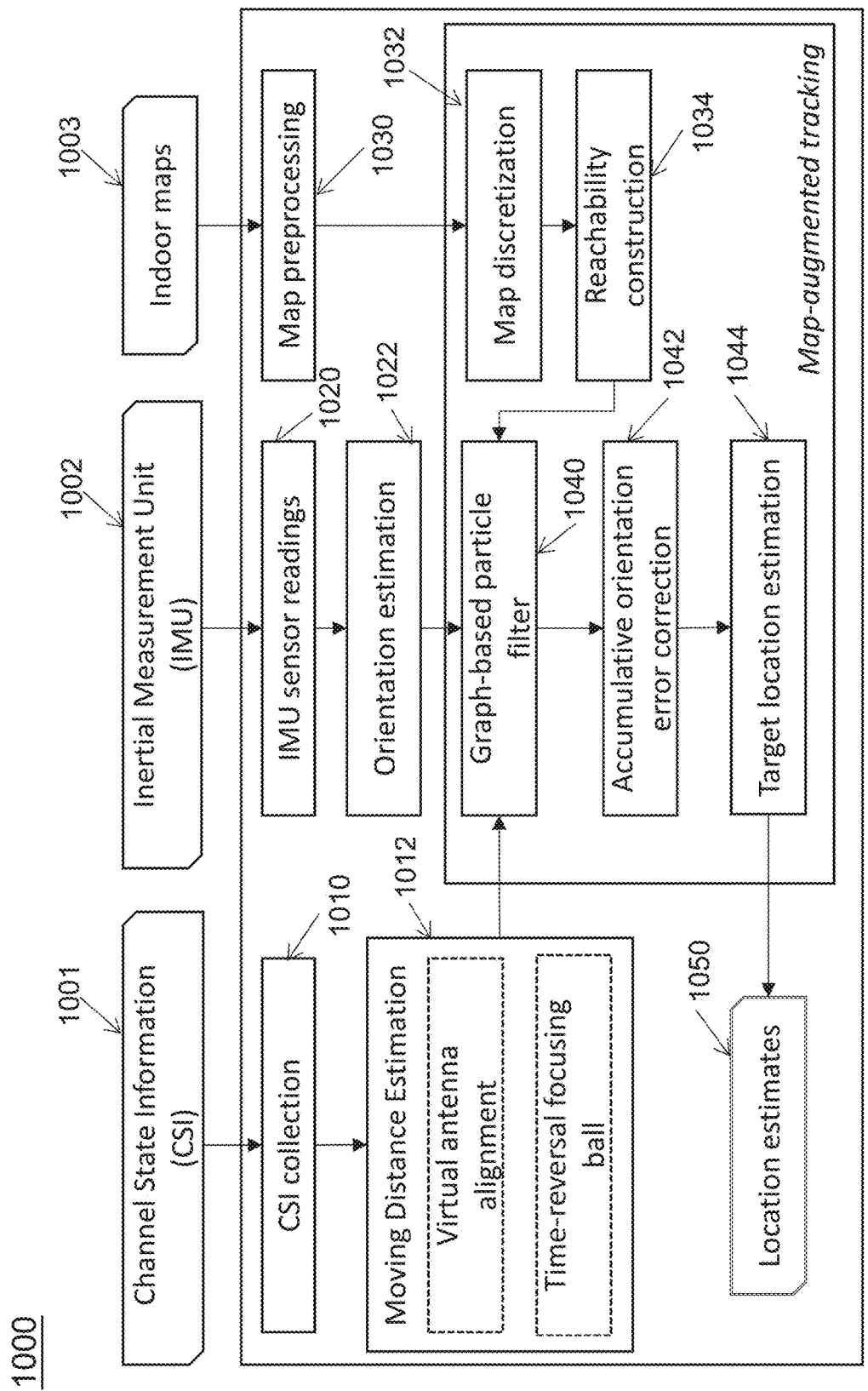
FIG. 10 shows a flowchart of a map-augmented tracking method, according to some embodiments of the present disclosure.

FIG. 10 shows a flowchart of a map-augmented tracking method 1000, according to some embodiments of the present disclosure. As shown in FIG. 10, a CSI collection 1010 is performed by collecting CSI 1001, e.g. of a wireless multipath channel. The collected CSI is used to estimate a moving distance at operation 1012, which may be based on a virtual antenna alignment (AA) method or a time-reversal focusing ball (FB) method as discussed above. The moving distance estimation result is provided to a graph-based particle filter 1040.

In addition, readings are obtained at operation 1020 from an EMU sensor 1002. An orientation estimation 1022 is performed based on these readings, and the orientation estimation result is provided to the graph-based particle filter 1040.

Further, a processing of indoor maps 1003 are performed at operation 1030; and the processed map information is used to perform a map discretization 1032. Then, a reachability construction 1034 is performed to generate a result provided to the graph-based particle filter 1040.

After the graph-based particle filter 1040, an accumulative orientation error correction 1042 is performed and target location estimation 1044 is performed to generate location estimates 1050 of the target object. As such, a movement of the target object is tracked or monitored by a map-augmented tracking technology. According to various embodiments, the order of some operations in FIG. 10 may be exchanged.

The present teaching discloses a ubiquitous indoor tracking system that achieves sub-meter accuracy in both LOS and NLOS scenarios using a single unknown AP and scales to massive buildings and end clients with almost zero cost. The present teaching also discloses a map-augmented probabilistic tracking algorithm based on a graph-based particle filter that fuses indoor maps with CSI-based distance and IMU-based direction information.

Initial location: In current EasiTrack, one can request user inputs for initial locations. As demonstrated by the disclosed experiments, EasiTrack can tolerate rather large initial location errors. Therefore the initial locations could be gathered by various methods, such as occasional GPS indoors, potential indoor distinct landmarks, ubiquitous BLE beacons, or by using massive particles for initialization. Exploring different methods for initial locations is in future work. Map understanding: Currently some manual efforts are required to pre-process a map (i.e., highlighting the inaccessible pixels). Since one only needs accessibility properties of pixels, this could be done automatically with the help of mature imaging processing techniques like edge extraction. The pre-processing will not be needed for modem maps that are captured in structured formats with high quality.

Map learning: Currently the disclosed graph model treats all vertexes (locations) equally. With data gathered from real-world deployment, the model could dynamically learn the probabilistic distributions of different locations. For example, people may tend to make a right turn at a certain location, while mostly go straight at another. By progressively learning the information, the tracking performance could be continuously improved.

Large open spaces: As demonstrated by the disclosed real-world deployments, EasiTrack generalizes to different buildings. It still needs improvement in case of large open spaces (e.g., a great hall), where the map hardly offers any useful information.

The present teaching discloses EasiTrack, an indoor location system that achieves sub-meter accuracy using a single AP and scales to many buildings with almost zero costs, making it a promising solution for ubiquitous indoor tracking. The present teaching discloses an approach for CSI-based moving distance estimation and a map-augmented tracking algorithm. One can deploy and verify the system in different buildings and facilities to track humans and machines.

In various embodiments of the present teaching, wireless tracking may be performed according the following clauses.

Clause A1: A method/apparatus/system of a wireless monitoring system, comprising: transmitting a series of probe signals by an antenna of a first wireless device using a processor, a memory and a set of instructions to at least one heterogeneous target wireless receiver through a wireless multipath channel in a venue, obtaining asynchronously by each of the at least one heterogeneous target wireless receiver at least one time series of channel information (CI time series) from the series of probe signals, the channel information (CI) being of the wireless multipath channel between the heterogeneous target wireless receiver and the first wireless device, monitoring iteratively asynchronously a respective motion associated with a respective object relative to a respective map based on respective at least one CI time series obtained from the series of probe signals by respective heterogeneous target wireless receiver, determining iteratively a respective incremental distance ($\Delta D$) travelled by the respective object in a respective incremental time period ($\Delta T$) based on the respective at least one CI time series, and computing iteratively a respective next location of the respective object at a respective next time (T1) in the respective map based on at least one of: a respective current location of the respective object at a respective current time (T2), the respective incremental distance ($\Delta D$), and a respective direction (theta) of the respective motion during the respective incremental time period.

Clause A2: The method/apparatus/system of the wireless monitoring system of clause A1: wherein a particular motion of a particular object is being monitored based on CI time series obtained by more than one heterogeneous target wireless receivers.

Clause A3: The method/apparatus/system of the wireless monitoring system of clause A1: wherein more than one respective motions associated with more than one respective objects are monitored relative to a particular map.

Clause A4: The method/apparatus/system of the wireless monitoring system of clause A1: wherein the respective incremental time period ($\Delta T$) is time difference between two respective probe signals of the series of probe signals.

Clause A5: The method/apparatus/system of the wireless monitoring system of clause A1: wherein the respective direction (theta) of the respective motion during the respective incremental time period is a respective function of at least one of: the respective direction of the respective motion at the respective current time (T2), the respective direction of the respective motion at the respective next time (T1) and the respective direction of the respective motion at another time.

Clause A6: The method/apparatus/system of the wireless monitoring system of clause A1, further comprising: computing the respective next location of the respective object at the respective next time in the respective map using particle filter.

Clause A7: The method/apparatus/system of the wireless monitoring system of clause A1, further comprising: initializing a respective initial number of respective initial candidate locations of the respective object at a respective initial time (T0), computing iteratively a first dynamic number (N1) of respective first candidate locations of the respective object at the next time based on a second dynamic number (N2) of respective second candidate locations of the respective object at the current time, computing the respective next location of the respective object at the respective next time based on at least one of: the first dynamic number of respective first candidate locations at the respective next time, and the second dynamic number of respective second candidate locations at the respective current time.

Clause A8: The method/apparatus/system of the wireless monitoring system of clause A7: wherein the respective object moves during the respective incremental time period in a respective region represented by the respective multi-dimensional map, wherein the respective multi-dimensional map is represented as a respective multi-dimensional array A, such that reachability of each location of the respective region is represented by corresponding array element a which is a logical value between 0 and 1, wherein the location is unreachable and forbidden if the array element a=0, wherein the location is fully reachable if a=1, wherein the location is partially reachable, if 0<a<1, wherein each of the respective next location, the respective current location, the first dynamic number of respective first candidate locations, and the second dynamic number of respective second candidate locations, is a point in the respective region and is represented as a corresponding array element a, with a>0, wherein the respective direction of the respective motion of the respective object at any respective location is locally represented as one of a number of allowable directions.

Clause A9: The method/apparatus/system of the wireless monitoring system of clause A8, further comprising: computing the first dynamic number (N1) of weights each associated with a respective first candidate location, each weight being a function of at least one of: the respective current location, the respective first candidate location, a corresponding respective second candidate location associated with the respective first candidate location, the respective direction of the respective motion, and a distance between the respective first candidate location and the first unreachable array element a in the respective direction, and computing the respective next location of the respective object based on the first dynamic number of respective first candidate locations, and the associated first dynamic number of weights.

Clause A10: The method/apparatus/system of the wireless monitoring system of clause A9: wherein each weight is a monotonic non-decreasing function of the distance between the respective first candidate location and the first unreachable array element a in the respective direction.

Clause A11: The method/apparatus/system of the wireless monitoring system of clause A9: wherein each weight is a bounded function of the distance between the respective first candidate location and the first unreachable array element a in the respective direction.

Clause A12: The method/apparatus/system of the wireless monitoring system of clause A9, further comprising: computing the respective next location of the respective object as a weighted average of the first dynamic number of respective first candidate locations.

Clause A13: The method/apparatus/system of the wireless monitoring system of clause A9, further comprising: computing the respective next location of the respective object as one of the respective first candidate location.

Clause A14: The method/apparatus/system of the wireless monitoring system of clause A9, further comprising: normalizing the weights.

Clause A15: The method/apparatus/system of the wireless monitoring system of clause A9, further comprising: computing weighted cost of each respective first candidate location with respect to the rest of the first dynamic number of respective first candidate locations, wherein the weighted cost is a weighted sum of pairwise distance between the respective first candidate location and each of the rest of the respective first candidate locations, wherein the weights are normalized, and choosing the respective next location of the respective object as the respective first candidate location with minimum weighted cost.

Clause M6: The method/apparatus/system of the wireless monitoring system of clause A8: wherein the multi-dimensional map is 2-dimensional, wherein the array A is a 2-dimensional array, wherein each array element a has two indices.

Clause A17: The method/apparatus/system of the wireless monitoring system of clause A8: wherein the multi-dimensional map is 3-dimensional, wherein the array A is a 3-dimensional array, wherein each array element a has 3 indices.

Clause A18: The method/apparatus/system of the wireless monitoring system of clause A8, further comprising: computing a predicted value for each of the second candidate location of the respective object based on at least one of: the second candidate location, the respective incremental distance ($\Delta D$), and the respective incremental time period ($\Delta T$), if the predicted value of the second candidate location is fully reachable with associated array element a=1, creating a first candidate location of the respective object based on the predicted value of the second candidate location, if the predicted value of the second candidate location is forbidden with associated array element a=0, labeling the second candidate location as "rejected" without creating any first candidate location, and if the predicted value of the second candidate location is partially reachable with associated array element 0<a<1, generating a random number between 0 and 1, and creating a first candidate location of the respective object based on the predicted value of the second candidate location if the random number is less than a.

Clause A19: The method/apparatus/system of the wireless monitoring system of clause A18, further comprising: if the amount of first candidate locations is smaller than a threshold, creating a new first candidate location of the respective object probabilistically taking on the predicted values of second candidate locations that are not rejected, with a probability distribution based on at least one of: weights associated with the predicted values, weights associated with the second candidate locations, array elements of the multi-dimensional array A associated with the predicted values, array elements of the multi-dimensional array A associated with the second candidate locations, and another probability distribution.

Clause A20: The method/apparatus/system of the wireless monitoring system of clause A18, further comprising: if the amount of first candidate locations is smaller than a threshold, creating a new first candidate location of the respective object probabilistically taking on the second candidate locations that are not rejected, with a probability based on weights associated with the predicted values of the second candidate locations that are not rejected.

Clause A21: The method/apparatus/system of the wireless monitoring system of clause A18, further comprising: if the amount of first candidate locations is smaller than a threshold, computing a tentative next location based on the amount of first candidate locations and creating a new first candidate location of the respective object probabilistically in a neighborhood of the tentative next location based on a probability distribution.

Clause A22: The method/apparatus/system of the wireless monitoring system of clause A18, further comprising: if the amount of first candidate locations is smaller than a threshold, creating a new first candidate location of the respective object probabilistically as a predictor of a location sampled in a neighborhood of the respective current location based on a probability distribution.

Clause A23: The method/apparatus/system of the wireless monitoring system of clause A22: wherein the neighborhood comprises at least one of the second candidate locations that are not rejected.

Clause A24: The method/apparatus/system of the wireless monitoring system of clause A22: wherein the probability distribution is a weighted sum of a set of probability density function (pdf), each centered at one of the second candidate locations that are not rejected.

Clause A25: The method/apparatus/system of the wireless monitoring system of clause A24: wherein at least two of the set of pdf are a common pdf.

Clause A26: The method/apparatus/system of the wireless monitoring system of clause A24: wherein the weight of each pdf associated with a second candidate location in the weighted sum is a function of the array element associated with the second candidate location.

Clause A27: The method/apparatus/system of the wireless monitoring system of clause A1, further comprising: maintaining a dynamic number of respective candidate locations at any time, changing the dynamic number of respective candidate locations by at least one of: initializing at least one respective candidate location, updating at least one respective candidate location, adding at least one respective candidate location, pausing at least one respective candidate location, stopping at least one respective candidate location, resuming at least one paused respective candidate location, reinitializing at least one stopped respective candidate location, and removing at least one respective candidate location, and computing the respective next location of the respective object at the respective next time based on at least one of: the dynamic number of respective candidate locations at the respective next time, and the dynamic number of respective candidate locations at another time.

Clause A28: The method/apparatus/system of the wireless monitoring system of clause A27: wherein the dynamic number of respective candidate locations is bounded by an upper limit at the respective current time.

Clause A29: The method/apparatus/system of the wireless monitoring system of clause A27: wherein the dynamic number of respective candidate locations may be bounded by a lower limit at some time.

Clause A30: The method/apparatus/system of the wireless monitoring system of clause A27, further comprising: adding at least one candidate location if the dynamic number of respective candidate locations is lower than a lower limit.

Clause A31: A method, implemented by a processor, a memory communicatively coupled with the processor, and a set of instructions stored in the memory to be executed by the processor, comprising: obtaining a plurality of time series of channel information (TSCI) of a wireless multipath channel, wherein: the plurality of TSCI are extracted from a wireless signal transmitted from a first wireless device to a second wireless device through the wireless multipath channel, each of the plurality of TSCI is associated with an antenna of the first wireless device and an antenna of the second wireless device, one of the first wireless device and the second wireless device is a stationary device, the other one of the first wireless device and the second wireless device is a moving device moving with an object, the moving device comprises at least two antennas; determining that a first channel information (CI) at a first time of a first TSCI associated with a first antenna of the moving device matches a second CI at a second time of a second TSCI associated with a second antenna of the moving device, wherein both the first TSCI and the second TSCI are associated with a particular antenna of the stationary device; computing at least one movement parameter of the moving device based on at least one of: the plurality of TSCI, a configuration of antennas of the moving device, a configuration of at least one antenna of the stationary device, a time difference between the first time and the second time, and a distance between the first antenna and the second antenna; computing a spatial-temporal information (STI) of the moving device based on at least one of: the at least one movement parameter, the first time, the second time, the configuration of antennas of the moving device, the configuration of at least one antenna of the stationary device, a past STI, and a past movement parameter, wherein at least one of the movement parameter and the STI is related to a current movement of the moving device; and tracking the object and the moving device based on the STI.

Clause A32: The method of clause A31, wherein: at least one of the movement parameter and the STI comprises at least one of: a location, a horizontal location, a vertical location, a length, an area, a volume, a capacity, a direction, an angle, a distance, a displacement, a speed, a velocity, an acceleration, a rotational speed, a rotational acceleration, a gait cycle, a presence, a motion type, a motion classification, a motion characteristics, a sudden motion, a transient motion, a periodic motion, a period of the periodic motion, a frequency of the periodic motion, a transient motion, a time trend, a timing, a timestamp, a time period, a time window, a sliding time window, a history, a frequency trend, a spatial-temporal trend, a spatial-temporal change, and an event; and tracking the object and the moving device comprises at least one of: determining a map location of the object, tracking the location of the object, tracking another motion analytics of the object, guiding movement of the object along a trajectory, guiding the movement of the object to avoid an obstacle, tracking motion of the object, tracking behavior of the object, object behavior identification, detecting the motion of the object, detecting a vital sign of the object, detecting a periodic motion associated with the object, detecting breathing of the object, detecting heartbeat of the object, detecting an event associated with the current movement, detecting a fall-down movement of the object, presenting the location of the object, presenting history of the location of the object, and displaying the location of the object graphically.

Clause A33: The method of clause A31, further comprising: determining that a third CI at a third time of a third TSCI associated with a third antenna of the moving device matches a fourth CI at a fourth time of a fourth TSCI associated with a fourth antenna of the moving device, wherein both the third TSCI and the fourth TSCI are associated with another particular antenna of the stationary device; computing a probability model for a movement parameter based on at least one of: the matching between the first CI and the second CI, the matching between the third CI and the fourth CI, and another matching between another two CI; and computing the at least one movement parameter of the moving device stochastically based on at least one of: the probability model, the plurality of TSCI, the configuration of antennas of the moving device, the configuration of antennas of the stationary device, a time difference between the first time and the second time, a time difference between the third time and the fourth time, a distance between the first antenna and the second antenna, and a distance between the third antenna and the fourth antenna, wherein the STI of the moving device is computed based on at least one of: the at least one movement parameter, the first time, the second time, the third time, the fourth time, the configuration of antennas of the stationary device, the configuration of antennas of the moving device, a past STI, and a past movement parameter.

Clause A34: The method of clause A31, further comprising: computing a probability model for the at least one movement parameter; computing the at least one movement parameter of the moving device stochastically based on the probability model; and computing the STI of the moving device stochastically based on the at least one stochastically computed movement parameter.

Clause A35: The method of clause A31, further comprising: computing a probability model for the at least one movement parameter; computing the at least one movement parameter of the moving device stochastically based on the probability model; computing a number of candidate STIs of the moving device stochastically, wherein each candidate STI is computed based on a stochastically computed movement parameter; and computing STI based on an aggregate of the candidate STIs.

Example: Stride Length Estimation

Stride length estimation has various applications, ranging from pedestrian tracking to individual healthcare. It is usually achieved by inertial sensing, which, however, suffers from large errors due to the noisy readings on the low-cost commodity sensors and unconstrained human walking. Different from prior methods that explore inertial sensors only, the present teaching discloses a fused radio and inertial sensing design that estimates fine-grained stride length. The disclosed approach incorporates recent advances in WiFi sensing that underpins walking distance estimation at centimeter accuracy from radio signals. Then a novel step detection algorithm is disclosed using inertial sensor readings, which not only counts steps but also reports the time information of every detected step. The algorithm then fuses the time-annotated distance estimates and steps to derive the stride length. The evaluation on a large public dataset shows that the step counting algorithm yields an error of 3%, Furthermore, experiments on commodity hardware with eight users demonstrate an error of about 2 cm in stride length estimation.

inertial sensing has been an inexpensive and convenient solution to many mobile applications, such as pedestrian dead-reckoning (PDR) and gait analysis, among many others. It has been employed to support clinical diagnostics to quantify and treat gait impairments, a symptom of may neurological or musculoskeletal diseases that may result in shuffling steps or reduced step length. On the other hand, PDR using low-cost inertial measurement units (IMUs) has been widely studied to offer alternative positioning when GPS is not available. It integrates the moving distance, typically estimated as the number of steps multiplying the step length, and heading information to provide continuous locations.

Despite extensive research, one of the most crucial components that are still open to inertial sensing is accurate estimation of stride length, a critical stride-by-stride parameter to both gait analysis and PDR. Many algorithms have been disclosed for step detection, such as zero-crossing, peak detection, and autocorrelation. Stride length estimation, however, is more complicated due to the noisy readings on cheap sensors, varying walking patterns among individuals and over time. Early solutions adopt over-simplified linear/non-linear models that suffer from errors. The majority of prior algorithms perform double integration of acceleration over time, which requires zero-velocity update points for reinitialization and is vulnerable to the noisy sensor data and motion interference. Recent works build neural networks to learn stride length, which, however, requires a large amount of data for training. Other modalities are also employed for stride length estimation, including camera systems, pressure sensors, etc. These systems, however, are less convenient and usually much more expensive than inertial sensors.

Nowadays, most mobile devices are equipped with inertial sensors as well as multi-antenna WiFi radios. This disclosure leverages this opportunity and consider to integrate the emerging radio sensing with traditional inertial sensing to achieve precise stride length estimation. The idea is to estimate the walking distance from radio signals while the corresponding steps taken from the IMU data. One can employ the virtual antenna alignment approach and implement it for mobile environments using a commodity WiFi card with two or three antennas. A user simply needs to walk freely with the radio in hand, and the walking distance will be estimated from the measured series of Channel State Information (CSI) of the received WiFi signals. One can first introduce a novel time-domain algorithm for step detection based on a finite state machine, which not only counts steps but also reports accurate starting and ending time of each detected step. Many existing approaches fail to obtain such time-annotated steps. Then the stride length can be estimated by dividing the moving distance by the corresponding number of walking cycles during the same period.

The experiments to validate the effectiveness of the algorithm include two parts. First, one can examine the step detection on a large public dataset. The dataset contains the time series of data measured on smartphones in typical, unconstrained use while walking. The evaluation on this dataset shows that the step counting algorithm achieves remarkable performance with error rates less than 5% for 90% of all the traces, outperforming 9 different approaches. In addition to the accurate step counting, the disclosed algorithm also outputs time information of every single step.

Then to evaluate the performance of stride estimation, one can implement and experiment with the disclosed algorithm on commodity hardware. Eight users are asked to walk normally while holding the device in hand. Both CSI and sensor data are collected during their walking. Notably, the stride length is estimated with a median error of around 2 cm.

There are many algorithms developed for step detection using inertial sensors. Conventional methods usually focus on counting how many steps have been taken given a sequence of accelerometer readings. To obtain precise stride length, one may need not only the step number but also the exact starting and ending time of each step so that one can later calculate the precise moving distance during the specific stride period via radio signals.

Figure 11:
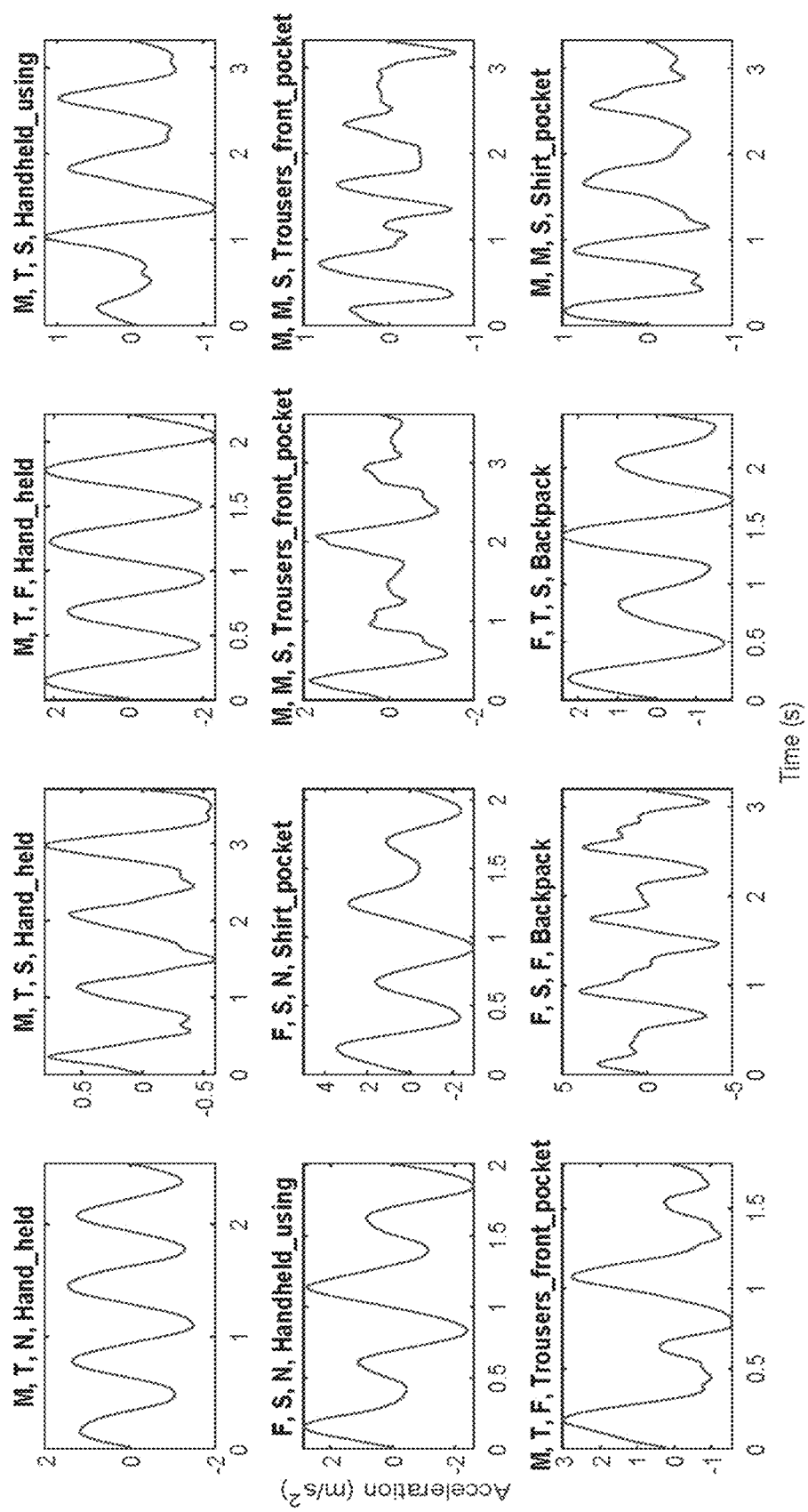
FIG. 11 illustrates different step patterns resulted from different subjects, speeds, and sensor placements, with each figure showing the acceleration series of 4 steps (two stride cycles), according to some embodiments of the present disclosure.

To achieve step detection with accurate timing information, the present teaching discloses a time-domain approach based on a Finite State Machine (FSM). The key insight is that a normal human walking cycle, albeit varying over individuals and speeds, submits to a typical template viewed from the inertial data. A stride cycle includes two phases: the stance and swing phases, which can be further decomposed into seven stages. The stance phase starts with the initial heel contact of one foot and ends when the same foot's toe leaves off the ground. The swing phase follows immediately with the action of the leg swinging forward and lasts until next heel contact. Intuitively, a stride cycle includes two steps, and the stride length is accordingly defined. In one embodiment, one does not differentiate two consecutive steps and thus calculates the step length as stride length, which is, on average, half of the commonly defined stride length. Ideally, during a step, the acceleration induced by walking motion will first increase to a large value; then decreases down to negative values, and finally returns to approximately zero. A typical and ideal acceleration change during a step is shown by the first figure in FIG. 11, while the other figures show how the patterns vary over different individuals, walking speeds, and sensor placements. Each figure in FIG. 11 is named in the format as Gender (M: Male, F: Female), Height (T: :180 cm-189 cm, M: 170 cm-179 cm, S: 150 cm-11.69 cm), Speed (N: Normal, F: Fast, S: Slow), Placement.

Figure 12:
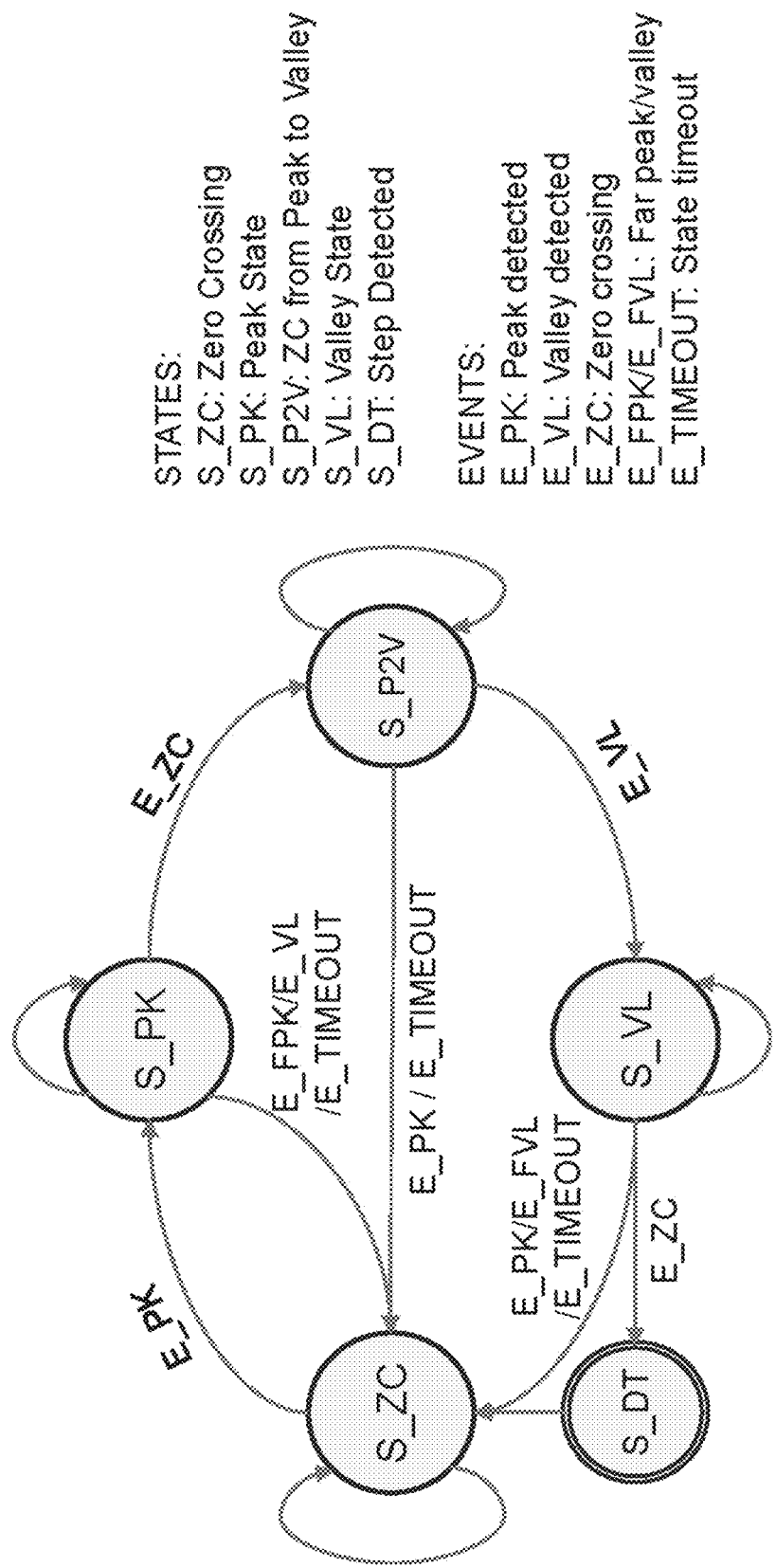
FIG. 12 illustrates an example of a Finite State Machine (FSM) for step detection, according to some embodiments of the present disclosure.

FSM design based on an in-depth understanding of the walking cycle, one can elaborate on an advanced FSM to characterize the acceleration transitions for step detection. As shown in FIG. 12, the FSM contains five different states:

S_ZC: The initial and default state when a zero-crossing is detected;
S_PK: The state when the acceleration tops a peak;
S_P2N: The state that a zero-crossing occurs when the acceleration decreases from the peak to a potential valley;
S_VL: The state at an acceleration valley;
S_DT: The state that a step is claimed.

To determine the state transition, one can define six basic events, which are all identifiable from the inertial sensor data.

E_PK: A peak is detected;
E_VL: A valley is detected;
E_ZC: A zero-crossing is observed;
E_FPK: A "far" peak is detected after a previous E_PK event without any intermediate events, but with a large time difference exceeding a threshold;
E_FVL: A valley similarly defined as E_FPK;
E_TIMEOUT: A timeout event will trigger if the FSM stays on one state for too long.

The first three events characterize the key properties of acceleration patterns during walking, while the latter three are derived from the first three coupling with time information to combat noises and non-walking motion interference.

By default, the algorithm stays on its current state until an event occurs, depending on which it will either transit to another state or remains unchanged. Each state only transits upon the specific events as marked in FIG. 12. All the states except for the default S_ZC is associated with a timeout event. State S_DT will return to S_ZC with any new data arriving. E_FPK and E_FVL are introduced to handle the cases of two consecutive peaks or valleys caused by noisy sensor readings and user motion interference. For example, if a subsequent peak is too close to a former one, the algorithm will treat it as distortion during walking and keep the same state; otherwise, it is more like random motion, and the state is reset to S_ZC.

The design of the algorithm achieves many strong sides. For each detected step, the algorithm outputs the timing information of the detected step: The time point of the corresponding S_ZC is the starting time, while the time it enters S_DT implies the ending time. The algorithm is efficient, with only a few states. It decomposes the relatively noisy sensor readings as several essential events, which can be identified without relying on many subject-dependent parameters, such that it does not heavily rely on the absolute accelerations.

Sensor data processing: The raw sensor data are processed into a series of events-of-interests as inputs for the above FSM. A key challenge here, however, is that the ideal acceleration pattern of a step will greatly vary over different walking patterns and device locations (e.g., hand-held, in the pocket, or the backpack, etc.). Moreover, the sensor data is noisy and could drift over time. FIG. 11 illustrates several different patterns of the walking cycles, including normal, distorted, or biased ones.

To handle various sensor patterns, one can perform a series of preprocessing steps. The accelerometer reports 3D sensor values along its x-axis, y-axis, and z-axis for every sample, denoted as $a=(a_x, a_y, a_z)$. The reported accelerations are in the device frame (rather than the earth's frame) and contain both motion-induced and gravity-forced components. One may need to compensate for gravity and transform the accelerations into the earth's reference frame. Fortunately, modern IMUs have done an excellent job in extracting the gravity component as a fusion sensor (usually named as gravity sensor) based on the accelerometer and gyroscope or magnetometer, which reports a gravity vector $g=(g_x, g_y, g_z)$. Thus, one can easily obtain the magnitude of the projected acceleration free of sensor orientation as:

$$a = \frac{a \cdot g}{\|g\|}. \quad (7)$$

Given a time series of the acceleration magnitude, denoted as $A=[a(t_1), a(t_2), \ldots, a(t_M)]$ where $a(t_i)$ is the reading at time $t_i$, one can further detrend the gravity and potential sensor drifting by removing the moving average trend. Since one may not need to process the data online for stride length estimation, one can employ a relatively long window of 2 s to calculate the moving average. Afterward, one can further smooth the detrended data with a window of 0.25 s.

Then one can perform zero-crossing and peak detection to identify all the events-of-interests from the data series (valley detection is done in the same way as peak detection by multiplying the data by −1). The processing results in a time series of events, denoted as $E=[e(t_1), e(t_2), \ldots, e(t_Q)]$ where $e(t_i) \in \{E\_PK, E\_VL, E\_ZC\}$ is the event occurs at time $t_i$. The events are sparse over the time series A since typically there are three E_ZC, one E_PK, and one within a standard step. This event series is then fed into the FSM for step detection. The other three events, i.e., E_FPK, E_FVL, E_TIMEOUT, are detected inside the FSM by examining timestamps of two consecutive E_PK, E_VL and the duration of the state itself, respectively. For example, an E_FPK occurs if $e(t_{i-1})=e(t_i)=E\_PK$ and $|t_i-t_{i-1}|>th_{max\_gap}$, where $th_{max\_gap}$ indicates a threshold that can be determined by human walking behavior.

By involving events (that is, specific relative patterns in the acceleration series) rather than absolute acceleration thresholds, the disclosed FSM is more generalized and robust to different walking patterns and sensor locations. FIG. 13A shows an example of the step detection results, which counts every step precisely with timing information.

Walking Distance Estimation with WiFi: To accurately estimate the walking distance at the centimeter level, one can utilize the idea of the virtual antenna alignment approach.

Take a two-antenna line array as an example. When the array moves along the line joining them, there will be one antenna following the trajectory of the other. The particular moving speed determines the time delay for the following antenna to hit the same location the other has traveled (i.e., the two antennas are virtually aligned) and thus observe the same (similar) multipath profiles. The time delay can be estimated by $$\Delta t(t) = |\arg\max_{k \in [-l, \cdots, l]} \eta(H_i(t), H_j(t+k))|, \quad (8)$$

where $H_i(t)$ is the CSI measurement at time t, l specifies the search window [t−l, t+l], and η is the Time-Reversal Resonating Strength (TRRS) calculated as $$\eta(H_i, H_j) = \frac{|H_i^H H_j|^2}{\langle H_i, H_i \rangle \langle H_j, H_j \rangle}, \quad (9)$$

where $(\cdot)^H$ denotes the conjugate transpose.

With Δt, the arrays moving speed can be immediately derived as $$v(t) = \frac{\Delta d}{\Delta t(t)}, \quad (10)$$

where Δd is the corresponding antenna separation known in advance. And the moving distance is thus calculated:

$$d = \int_0^T v(t)dt, \quad (11)$$

where T is the time duration of moving.

Considering the scenario of stride length estimation, the user needs to hold the device in hand to increase the chance of virtual antenna alignment while walking. The virtual antenna alignment can tolerate a deviation angle of 15° gracefully during moving. This is a critical property that makes it applicable to hand-held mobile scenarios: Even during walking, a cooperative user can hold the device relatively stably with little chance of producing significant deviation beyond 15°. As shown in FIGS. 13B and 13C, the walking speeds can be accurately tracked when a user is normally walking while holding the Win device in hand.

FIG. 13 shows an example of the steps detected by inertial sensing and walking distance (speed) estimated by WiFi-based sensing. In FIG. 13A, the squares denote the detected steps, triangles denote peaks and valleys, and circles indicate zero-crossing points. FIG. 13B shows the TRRS matrix with identified antenna alignment delays (line). FIG. 13C shows the estimated speeds.

More generally, given a walking trace, suppose one has detected a series of N steps $S=[s_1, s_2, \ldots, s_N]$, each step $s_i$ starting at time $t_{i-1}$ and ending at time $t_i$, and have estimated the corresponding instantaneous speed series $V=[v(t), t=1, 2, \ldots, T]$. It is then straightforward to derive the average stride length L as $$L = \frac{\int_0^T v(t)dt}{N}. \quad (12)$$

The estimation can be improved to be more robust to different lengths of the walking traces and/or varying stride lengths during a walking instance. Particularly, one can additionally calculate the stride length by using only the first k steps with k ranging from 1 to N:

$$L^k = \frac{\int_0^{t_k} v(t)dt}{k}, k = 1, 2, \cdots, N. \quad (13)$$

Then one can take the median value as the estimate, i.e., $L=\text{Med}_k(L^k)$.

With the instantaneous speed estimation and the fine-grained step detection, one can even calculate the step-by-step stride lengths, rather than merely the average value. Specifically the stride length for the ith step can be obtained as the moving distance within that step: $L_i = \int_{t_{i-}}^{t_i} 1^{t_i} v(t)dt$. Such fine-grained data would be useful for analyzing the variations of one's walking.

The fused radio and inertial sensing method contributes a distinct novel solution to the stride length estimation problem. It is immune to the noisy sensor readings, and the accumulative errors clung to the double integration approach. It is insensitive to sensor orientation and placement locations. And most importantly, it achieves high accuracy attributed by the precise step detection mechanism and the fine-grained distance estimation.

Discussions. In practice, if unknown motion data (not necessarily walking) are offered, potential false alarms may increase. Thus one may need to further improve the robustness in practical scenarios with various sensory data. One may introduce a post-validation step using autocorrelation to reject false alarms. Second, one may implement the step detection algorithm in an offline form. One may make it online to report steps for real-time streaming data, which may extend the applicability scope of the disclosed approach. Third, one may apply the stride length estimation to indoor tracking problems.

In one embodiment, human walking involves swinging motion (e.g. of two legs) with two alternate steps: (a) moving (e.g. swinging) one movable limb (e.g. left leg), and then (b) moving (swinging) another movable limb (e.g. right leg). A swinging motion is basically a repeating (or periodic) motion cycle with several observable phases. Acceleration (magnitude) may be used to track the series of strides as the user walks. A stride may be characterized by 4 states: standby, maximum (positive) acceleration, transition to zero acceleration, and then minimum (negative) acceleration, and back to standby. Other repeating motion of interest include: periodic motions of which each "cycle" has observable amount of peaks (local max) and valleys (local min). If the motion statistics (e.g. acceleration) has zero mean, a simplest motion cycle has the sequence of: zero, maximum, zero, minimum, and back to zero. Or, alternative, zero, minimum, zero, maximum, zero. If the motion statistics does not have zero mean (e.g. acceleration with slow drifting), mean can be subtracted and then the motion cycle may have the sequence of: zero, max, zero, min, zero. Alternatively, the non-zero motion statistics may have the sequence of: mean, above-mean maximum, mean, below-mean minimum, mean. Nowadays, smart phones have inertia measure unit (IMU) which can give acceleration. The acceleration can be converted from device frame (or device coordinate system, which changes relative to the earth due to human motion) to earth frame (or earth coordinate system), with compensation for acceleration due to gravity.

In one embodiment, an algorithm may be described as below. In a first step: use inertial sensor input to construct finite state machine (FSM). This includes the following (a) IMU obtains device frame acceleration. (b) IMU converts device frame acceleration to earth frame acceleration, with compensation for gravity. (c) The device obtains earth frame acceleration and computes acceleration magnitude (which is very noise and has drifting problem). (d) The device pre-processes the acceleration magnitude by removing the moving average (i.e. subtract local mean, or mean subtraction) to address the drifting problem. The mean removal is done in two stages: first stage using 2-second time window for moving average, and second stage using 0.25-second time window. The 2-stage mean subtraction is equivalent to some 1-stage lowpass filtering. (e) The device analyzes acceleration magnitude to find "acceleration peak", "acceleration zero crossing", and "acceleration valley". Peak detection algorithm is used to detect "peak" and applied again to negated signal to detect "valley". Typically one "peak", one "valley" and three "zero" in a stride cycle. Note that "zero" is detected 3 times: in state a (standby), in state c (zero crossing" and in state e (end of stride cycle/standby). (f) Sometimes error condition may occur. Thus "far peak" condition is detected if current "peak" is detected directly after previous "peak", with no "zero" or "valley" or "standby", and the time between current peak and previous peak is greater than a threshold. (g) Similarly, "far valley" condition is detected if current "valley" is detected directly after previous "valley", with no "zero" or "peak" or, and the time between current peak and previous peak is greater than a threshold. (h) Another error condition is no state transition for a long time. "timeout" is FSM stays in one state for too long. Other error condition is "valley" observed after "peak" with "zero". Or, "peak" observed after "zero". Or, "peak" after "valley" without "standby".

In a second step: compute timing of each of the 4 or 5 states (state a and state e are essentially the same state, except that state e declares "complete stride cycle detected") of Stride cycle based on IMU data, which includes the following. (a) initial/standby state, (which transition to state b if "peak" is observed); (b) acceleration peak, (which transition to state c if "zero" is observed, or state a if error occurs); (c) zero-crossing of acceleration (from positive to negative), (which transit to state d if "valley" is observed, or state a if error occurs); (d) Acceleration valley or min, (which transition to state e if "zero" is observe, or to state a if error occurs); (e) detect a complete stride cycle (which transition to state a automatically).

In a third step: use WiFi CSI to estimate distance/speed/acceleration using methods: (1) antenna matching, or (2) focusing ball, or (3) WiSpeed, or a combination of them. One can optionally use angle input (e.g. computed using CSI, or input from IMU).

In a fourth step: compute the instantaneous stride length based on the states and the timing of the states from the MILT data analysis and the distance/speed/acceleration from WiFi CSI analysis. Compute another statistics (e.g. average, median, mode, trimmed mean, weighted average, time-weighted average, variability measure, variance, standard deviation, variation measure, absolute variation, total variation, average variation, square variation, mean square variation, deviation measure, divergence, divergence measure, range, interquartile range, dispersion, diversion, moving average, moving median, moving mode, historical stride length, long term statistics, short term statistics, histogram, etc.).

Clause B1: A method/apparatus/system of a rhythmic motion monitoring system, comprising: obtaining a time series of channel information (CI) of a wireless multipath channel of a venue using a processor, a memory communicatively coupled with the processor and a set of instructions stored in the memory, wherein the time series of CI (TSCI) is extracted from a wireless signal transmitted between a Type 1 heterogeneous wireless device (wireless transmitter) and a Type 2 heterogeneous wireless device (wireless receiver) in the venue through the wireless multipath channel, wherein the wireless multipath channel is impacted by a rhythmic motion of an object in the venue; monitoring the rhythmic motion of the object jointly based on a time series of sensing information (TSSI) obtained from a sensor moving with the object and the TSCI; and triggering a response action based on the monitoring of the rhythmic motion of the object.

Clause B2: The method/apparatus/system of the rhythmic motion monitoring system of clause B1: wherein the rhythmic motion comprises at least one of: a walking motion, gait, marching motion, pacing motion, running motion, galloping action, troting action, body motion, leg motion, hand motion, finger motion, trunk motion, torso motion, head motion, repeated motion, complex repeated motion, robotic motion, mechanic motion, wind-induced motion, curtain motion, current-induced motion, fluid motion, vibration, earthquake, tremor, shaking motion, quivering motion, trembling motion, musical motion, dancing motion, oscillation, regular motion, periodic motion, breathing motion, heartbeat motion, palpitating motion, relaxation oscillation, increasing motion, decreasing motion, expanding motion, contracting motion, pulsating motion, pumping motion, pounding motion, thudding motion, throbbing motion, hammering motion, alternating motion, coordinated motion, combination of multiple repeated motion, modulated motion, mixed motion, composite motion with at least one underlying rhythm, motion coupled to another rhythmic motion of another object, transient motion with rhythmic details, fall-down motion, collision, impact, and a motion coupled to a rhythm.

Clause B3: The method/apparatus/system of the rhythmic motion monitoring system of clause B1: wherein a sensing information (SI) comprises at least one of: acceleration, 3-axis acceleration, acceleration magnitude, angular rate, 3-axis angular rate, inclination, 3-axis inclination, orientation, 3-axis orientation, force information, light information, heat information, temperature, and another sensing information; wherein a channel information (CI) comprises at least one of: channel state information (CSI), channel impulse response (CIR), channel frequency response (CFR), magnitude of at least one of: CSI, CIR and CFR, phase of at least one of, CSI, CIR and CFR, component of at least one of: CSI, CIR and CFR, signal strength, signal amplitude, spectral power measurement, modem parameters, dynamic beamforming information, transfer function components, radio state, measurable variables, sensed data, coarse-grained information of a layer, fine-grained information of a layer, and another channel information; wherein the layer comprises at least one of: physical layer, MAC layer, data link layer, network layer, transport layer, session layer, presentation layer, application layer, network interface, internee, TCP, LDP, IP, Ethernet, and another layer.

Clause B4: The method/apparatus/system of the rhythmic motion monitoring system of clause B1, further comprising: computing a time series of intermediate quantity (IQ) based on the TSCI; computing a time series of second intermediate quantity (SIQ) based on the TSSI, wherein the time series of IQ (TSIQ) and the time series of SIQ (TSSIQ) are asynchronous; and monitoring the rhythmic motion of the object based on the TSIQ and the TSSIQ.

Clause B5: The method/apparatus/system of the rhythmic motion monitoring system of clause B4: wherein at least one of an intermediate quantity (IQ) and a second intermediate quantity (SIQ) to comprise at least one of: a state associated with a cycle of the rhythmic motion, an event associated with the cycle of the rhythmic motion, a state of a finite state machine (FSM) associated with cycles of the rhythmic motion, an event associated with a state transition of the FSM, a rhythmic detail of the cycle of the rhythmic motion, an in-cycle detail of the cycle of the rhythmic motion, a timing of at least one of: state, event, rhythmic detail, and in-cycle detail associated with the cycle, a time stamp, a starting time, an ending time, a time code, a timing, a time period, a time duration, a frequency, a period, a cycle, a rhythm, a pace, a count, an indicator, an occurrence, a state, a set, a distance, a displacement, a direction, a speed, a velocity, an acceleration, an angular distance, an angular speed, an angular acceleration, a change of location, a change of direction, a change of speed, a change of acceleration, a proximity, a presence, an absence, an appearance, a disappearance, a location, a statistics, a motion statistics, a breathing statistics, a distance statistics, a speed statistics, an acceleration statistics, a metric, an 1_k distance metric, an 1_0 distance metric, an 1_1 distance metric, an absolute distance metric, an 1_2 distance metric, a Euclidean distance metric, an 1_infinity distance metric, a path, a volume, a mass, a surface area, a shape, a posture, an energy, a trend, a time sequence, a label, a tag, a class, a category, a time profile, a time quantity, a frequency quantity, a transient quantity, an incremental quantity, an instantaneous quantity, an averaged quantity, a locally averaged quantity, a filtered quantity, a quantity change, a repeating quantity, an event, a recognized event, a recognized motion sequence, a gesture, a hand gesture, a finger gesture, a wrist gesture, an elbow gesture, an arm gesture, a shoulder gesture, a head gesture, a facial gesture, a neck gesture, a waist gesture, a leg gesture, a foot gesture, a maximum, a minimum, a constrained maximum, a constrained minimum, a local maximum, a local minimum, a first local maximum, a first local minimum, a k-th local maximum, a k-th local minimum, an average, a weighted average, a percentile, a mean, a median, a mode, a trimmed mean, a conditional mean, a conditional statistics, an ordered statistics, a variance, a skewness, a kurtosis, a moment, a high order moment, a cumulant, a correlation, a covariance, a co-skewness, a co-kurtosis, a first order statistics, a second order statistics, a third order statistics, a high order statistics, a robust quantity, an argument associated with another quantity, a feature of a CI, a complex component of a CI, a magnitude of the complex component, a phase of the complex component, a function of the complex component of the CI, a polynomial of the magnitude of the complex component, a square of the magnitude of the complex component, a time series of the feature of CI, an autocorrelation function of the feature of CI, a function of another quantity, and the another quantity.

Clause B6: The method/apparatus/system of the rhythmic motion monitoring system of clause B4, further comprising: computing an autocorrelation function (ACF) associated with a time stamp based on the TSCI; computing an IQ associated with the time stamp based on the ACF.

Clause B7: The method/apparatus/system of the rhythmic motion monitoring system of clause B6, further comprising: computing the IQ based on at least one of: a local maximum, first local max, second local max, third local max, local minimum, first local min, second local min, third local min, zero-crossing, first zero, second zero, third zero, of the ACF.

Clause B8: The method/apparatus/system of the rhythmic motion monitoring system of clause B4, further comprising: computing a similarity score between a first CI of the TSCI at a first time and a second CI of the TSCI at a second time; comparing the similarity score against a reference function; determining that the value of the reference function at a particular argument is equal to the similarity score; computing the IQ based on the similarity score, the reference function, the particular argument, and a time difference between the first time and the second time.

Clause B9: The method/apparatus/system of the rhythmic motion monitoring system of clause B4, further comprising: wherein the IQ comprises at least one of: a distance, speed, acceleration, angular displacement, and heading direction of the rhythmic motion of the object; wherein the wireless signal is transmitted by M antennas of the Type1 device and received by N antennas of the Type2 device; obtaining more than one TSCI of the wireless multipath channel extracted from the wireless signal, wherein each TSCI associated with an antenna of the Type1 device and an antenna of the Type2 device; wherein at least one of: the Type1 device and the Type2 device, is a stationary device; wherein the other one of: the Type1 device and the Type2 device, is a moving device moving with the object; determining that a first CI at a first time of a first TSCI associated with a first antenna of the moving device matches a second CI at a second time of a second TSCI associated with a second antenna of the moving device, wherein both the first TSCI and the second TSCI are associated with the same antenna of the stationary device; computing the IQ based on at least one of: the more than one TSCI, a configuration of antennas of the moving device, a configuration of at least one antenna of the stationary device, a time difference between the first time and the second time, and a distance between the first antenna and the second antenna.

Clause B10: The method/apparatus/system of the rhythmic motion monitoring system of clause B4, further comprising: determining a finite state machine (FSM) associated with the rhythmic motion, wherein the FSM comprises: at least two states associated with the rhythmic motion, and state transitions among the at least two states each triggered by at least one state-transition event associated with the rhythmic motion; analyzing the TSSI in relation to the FSM; detecting a time series of detected events based on the analysis of the TSSI, wherein each detected event is one of the at least one state-transition event associated with the FSM, wherein each detected event is associated with an event time, wherein the TSSIQ comprises at least one of: the time series of detected events, the associated event times, and the resulting states according to the FSM; monitoring the rhythmic motion of the object based on the TSSIQ, the time series of detected events, the associated event times, and the resulting states according to the FSM.

Clause B11: The method/apparatus/system of the rhythmic motion monitoring system of clause B10, further comprising: identifying a complete cycle of rhythmic motion with associated starting time and ending time based on the analysis of the TSSI; monitoring the rhythmic motion of the object based on the identified complete cycle.

Clause B12: The method/apparatus/system of the rhythmic motion monitoring system of clause B11, further comprising: wherein a logical sequence of state transitions is associated with the complete cycle of the rhythmic motion of the object; detecting the logical sequence of state transitions based on at least one of: the analysis of the TSSI and an analysis of the time series of detected events; identifying the complete cycle of the rhythmic motion based on the detected logical sequence of state transitions.

Clause B13: The method/apparatus/system of the rhythmic motion monitoring system of clause B11, further comprising: wherein a logical sequence of states is associated with the complete cycle of the rhythmic motion of the object; detecting the logical sequence of states based on at least one of: the analysis of the TSSI and an analysis of the time series of detected events; identifying the complete cycle of the rhythmic motion based on the detected logical sequence of states.

Clause B14: The method/apparatus/system of the rhythmic motion monitoring system of clause B10, further comprising: identifying a partial cycle of rhythmic motion with associated starting time and ending time based on the analysis of the TSSI; monitoring the rhythmic motion of the object based on the identified partial cycle.

Clause B15: The method/apparatus/system of the rhythmic motion monitoring system of clause B14, further comprising: wherein a logical sequence of state transitions is associated with the partial cycle of the rhythmic motion of the object; detecting the logical sequence of state transitions based on at least one of: the analysis of the TSSI and an analysis of the time series of detected events; identifying the partial cycle of the rhythmic motion based on the detected logical sequence of state transitions.

Clause B16: The method/apparatus/system of the rhythmic motion monitoring system of clause B14, further comprising: wherein a logical sequence of states is associated with the partial cycle of the rhythmic motion of the object; detecting the logical sequence of states based on at least one of: the analysis of the TSSI and an analysis of the time series of detected events; identifying the partial cycle of the rhythmic motion based on the detected logical sequence of states.

Clause B17: The method/apparatus/system of the rhythmic motion monitoring system of clause B10: wherein the at least two states comprise at least one of the following states: initial, last, standby, default, error, reset, start, stop, time-out, cycle-start, cycle-end, full-cycle-detected, first-half-cycle-detected, second-half-cycle-detected, middle-half-cycle-detected, first-quarter-cycle-detected, second-quarter-cycle-detected, third-quarter-cycle-detected, fourth-quarter-cycle-detected, partial-cycle-detected, local-maximum (local-max), positive-local-max, high-local-max, medium-localmax, low-local-max, first-local-max, second-local-max, third-local-max, Nth-local-max, local-minimum (local-min), negative-local-min, deep-local-min, medium-local-min, shallow-low-min, first-local-min, second-local-min, third-local-min, Nth-local-min, zero-crossing (zero), steep-zero, medium-zero, gentle-zero, initial-zero, first-zero, second-zero, third-zero, Nth-zero, last-zero, positive-to-negative-zero, steep-positive-to-negative-zero, medium-positive-to-negative-zero, gentle-positive-to-negative-zero, negative-to-positive-zero, steep-negative-to-positive-zero, medium-negative-to-positive-zero, gentle-negative-to-positive zero, mean-crossing (meanC), steep-meanC, medium-meanC, gentle-meanC, initial-meanC, first-meanC, second-meanC, third-meanC, Nth-meanC, last-meanC, positive-to-negative-meanC, steep-positive-to-negative-meanC, medium-positive-to-negative-meanC, gentle-positive-to-negative-meanC, negative-to-positive meanC, steep-negative-to-positive-meanC, medium-negative-to-positive-meanC, gentle-negative-to-positive meanC, "peak", high-peak, medium-peak, low-peak, first-peak, second-peak, third-peak state, Nth-peak, "valley", deep-valley, medium-valley, shallow-valley, first-valley, second-valley, third-valley, Nth-valley, peak-to-valley, steep-peak-to-valley, medium-peak-to-valley, gentle-peak-to-valley, peak-to-valley-zero, peak-to-valley-meanC, valley-to-peak, steep-valley-to-peak, medium-valley-to-peak, gentle-valley-to-peak, valley-to-peak-zero, valley-to-peak-meanC, acceleration-peak, acceleration-valley, acceleration-peak-to-valley, acceleration-valley-to-peak, acceleration-local-max, acceleration-local-min, acceleration-zero, acceleration-positive-to-negative-zero, acceleration-negative-to-positive-zero, acceleration-meanC, acceleration-positive-to-negative-meanC, acceleration-negative-to-positive-meanC, stride-stance-phase, stride-foot-on-ground, double-support, initial-contact, loading-response, single-support, mid-stance, terminal stance, stride-swing-phase, stride-foot-in-air, pre-swing, initial swing, mid-swing, terminal-swing, breathing-inhale, breathing-exhale, breathing-inhale-to-exhale, breathing-exhale-to-inhale, heartbeat-P-wave, heartbeat-Q-wave, heartbeat-R-wave, heartbeat-S-wave, heartbeat-T-wave, heartbeat-PR-interval, heartbeat-QRS-complex, heartbeat-ST-segment, and another state.

Clause B18: The method/apparatus/system of the rhythmic motion monitoring system of clause B10: wherein the state transitions comprise at least one of the following actions: starting in at least one of: a start state, initial state, cycle-start state, standby state, and default state, ending in at least one of: a stop state, last state, cycle-end-state, standby-state, default-state, error-state, reset state, time-out state and any state, remaining in a same state, transitioning to at least one next state in a normal cycle, transitioning to at least one of: a cycle-detected state, half-cycle-detected state, quarter-cycle-detected and partial-cycle-detected state, in the normal cycle, and transitioning to at least one of: a start state, initial state, cycle-start state, standby state, default state, reset-state, error state, stop state, time-out state, and cycle-end state, in at least one of: an erroneous cycle and an abnormal cycle.

Clause B19: The method/apparatus/system of the rhythmic motion monitoring system of clause B10, further comprising: computing a time series of features (TSF) based on the TSSI, wherein the at least one state-transition event comprise at least one of the following events: at least one of: peak-detected, high-peak-detected, medium-peak-detected, low-peak-detected, first-peak-detected, second-peak-detected, third-peak-detected, and Nth-peak-detected, based on at least one of: a detection of local maxima (peaks) of the TSF associated with the TSSI at respective event times, a counting of the local maxima, and a thresholding of an amplitude of each local maximum, at least one of: valley-detected, deep-valley-detected, medium-valley-detected, shallow-valley-detected, first-valley-detected, second-valley-detected, third-valley-detected, and Nth-valley-detected, based on at least one of: a detection of local minima (valleys) of the TSF at respective event times, a counting of the local minima, and a thresholding of an amplitude of each local minimum, at least one of: peak-to-valley-detected, steep-peak-to-valley-detected, medium-peak-to-valley-detected, gentle-peak-to-valley-detected, peak-to-valley-zero-detected, and peak-to-valley-meanC-detected, based on at least one of: a detection of zero-crossings (zeros) of the TSF at respective event times, a counting of the zero-crossings, a thresholding of a derivative at each zero-crossing, a detection of second zero-crossings of a mean-subtracted TSF at respective event times, a counting of the second zero-crossings, and another thresholding of another derivative at each second zero-crossing, at least one of: valley-to-peak-detected, steep-valley-to-peak-detected, medium-valley-to-peak-detected, gentle-valley-to-peak-detected, valley-to-peak-zero-detected, and valley-to-peak-meanC-detected, based on at least one of: a detection of zero-crossings (zeros) of the TSF at respective event times, a counting of the zero-crossings, a thresholding of a derivative at each zero-crossing, a detection of second zero-crossings of the mean-subtracted TSF at respective event times, a counting of the second zero-crossings, and another thresholding of another derivative at each second zero-crossing, local-max-detected, positive-local-max-detected, high-local-max-detected, medium-local-max-detected, low-local-max-detected, first-local-max-detected, second-local-max-detected, third-local-max-detected, Nth-local-max-detected, based on at least one of: a detection of local maxima (peaks) of the TSF at respective event times, a counting of the local maxima, and a thresholding of an amplitude at each local maximum, local-min-detected, negative-local-min-detected, deep-local-min-detected, medium-local-min-detected, shallow-low-min-detected, first-local-min-detected, second-local-min-detected, third-local-min-detected, Nth-local-min-detected, based on at least one of: a detection of local minima (valleys) of the TSF at respective event times, a counting of the local minima, and a thresholding of an amplitude at each local minimum, zero-crossing-detected (zero-detected), steep-zero-detected, medium-zero-detected, gentle-zero-detected, initial-zero-detected, first-zero-detected, second-zero-detected, third-zero-detected, Nth-zero-detected, last-zero-detected, based on at least one of: a detection of zero-crossings (zeros) of the TSF at respective event times, a counting of the zero-crossings, and a thresholding of a derivative at each zero-crossing, mean-crossing-detected (meanC-detected), steep-meanC-detected, medium-meanC-detected, gentle-meanC-detected, initial-meanC-detected, first-meanC-detected, second-meanC-detected, third-meanC-detected, Nth-meanC-detected, last-meanC-detected, based on at least one of: a detection of zero-crossings of the mean-subtrated TSF at respective event times, a counting of the zero-crossings, and a thresholding of a derivative at each zero-crossing, time-out-detected based on a state-dependent thresholding of a state duration, error-detected based on a detection of an error, peak-peak-error-detected based on a detection of two consecutive peaks with time difference exceeding a first threshold without any in-between detected valley or detected zero, peak-valley-error-detected based on a detection of valley after a peak with time difference exceeding a second threshold without any in-between detected zero, zero-zero-error-detected based on a detection of two consecutive zero-crossings with time difference exceeding a third threshold without any in-between detected peak or detected valley, zero-peak-error-detected based on a detection of a peak after zero with time difference exceeding a fourth threshold without any in-between detected valley or detected zero, zero-valley-error-detected based on a detection of a valley after zero with time difference exceeding a fifth threshold without any in-between detected peak or detected zero, valley-valley-error-detected based on a detection of two consecutive valleys with time difference exceeding a sixth threshold without any in-between detected peak or detected zero, valley-peak-error-detected based on a detection of a peak after a valley with time difference exceeding a seventh threshold without any in-between detected zero, and another event.

Clause B20: The method/apparatus/system of the rhythmic motion monitoring system of clause B19: wherein each feature of the TSF is computed based on a respective SI of the TSSI.

Clause B21: The method/apparatus/system of the rhythmic motion monitoring system of clause B19: wherein each SI comprises a 3-axis acceleration of the sensor moving with the object, the 3-axis acceleration being associated with the rhythmic motion of the object; wherein each feature of the TSF is computed based on a magnitude of a respective 3-axis acceleration of a respective SI.

Clause B22: The method/apparatus/system of the rhythmic motion monitoring system of clause B10, further comprising: analyzing the time series of detected events, the associated event times and the resulting states according to the FSM; monitoring the rhythmic motion of the object based on the analysis.

Clause B23: The method/apparatus/system of the rhythmic motion monitoring system of clause B10, further comprising: computing an analytics of the rhythmic motion based on at least one of: the TSCI, the TSSI, the TSIQ, the TSSIQ, the time series of detected events, event times associated detected events, at least one complete cycle of the rhythmic motion and at least one partial cycle of the rhythmic motion.

Clause B24: The method/apparatus/system of the rhythmic motion monitoring system of clause B23, further comprising: identifying a cycle end-time associated with a full-cycle-detected event associated with the FSM and the TSSIQ; identifying a cycle start-time associated with an immediate past full-cycle-detected event associated with the FSM and the TSSIQ; computing a cycle-wise analytics based on a time window of the TSIQ, the time window spanning from the cycle start-time to the cycle end-time.

Clause B25: The method/apparatus/system of the rhythmic motion monitoring system of clause B23, further comprising: identifying an N-cycle end-time associated with a full-cycle-detected event associated with the FSM and the FSSIQ, wherein N is an integer greater than zero; identifying an N-cycle start-time associated with an N-th past full-cycle-detected event associated with the FSM and the FSSIQ; computing an N-cycle-wise analytics based on a time window of the TSIQ, the time window spanning from the N-cycle start-time to the N-cycle end-time.

Clause B26: The method/apparatus/system of the rhythmic motion monitoring system of clause B4 or clause B25, further comprising: replacing the time window by a replacement time window computed based on at least one of: TSCI and TSIQ, wherein an end-time of the replacement time window is a current time; computing a duration of the replacement time window based on a local characteristics of an autocorrelation function (ACF) associated with TSIQ, wherein the local characteristics comprises at least one of: local maximum, local minimum, zero crossing, local maximum of a derivation of IQ, local minimum of the derivative, and zero crossing of the derivative, computing a start-time of the replacement window based on the duration and the end-time.

Clause B27: The method/apparatus/system of the rhythmic motion monitoring system of clause B26, further comprising: monitoring the rhythmic motion of the object based solely on TSCI, without the TSSI.

Clause B28: The method/apparatus/system of the rhythmic motion monitoring system of clause B23: wherein the analytics comprises at least one of: at least one of: a feature, state, status, event, condition, count, statistics, location, position, region, spatial coordinate, orientation, direction, heading direction, bearing, angle, placement, deformation, distortion, contraction, expansion, gesture, expression, presentation, manifestation, material, material property, shape, texture, material, color, electromagnetic characteristics, visual pattern, wetness, reflectance, translucency, flexibility, surface, pose, body language, sign, gesture, handwriting, motion type, motion classification, motion characteristics, motion attribute, activity, behavior, length, width, height, area, volume, size, scale, speed, acceleration, time, timing, period, frequency, measurable quantity, instantaneous quantity, recent quantity, past quantity, future quantity, predicted quantity, in-cycle quantity, inter-state quantity, and statistics, associated with at least one of: a cycle, cycle of the rhythmic motion, half-cycle, quarter-cycle, partial cycle, two-cycle, double cycle, four-cycle, quad-cycle, N-cycle, gait cycle, stride, step, 2-step stride, 4-step stride, N-step stride, at least one of: a function, function of function, composite function, stridewise function associated with a stride, stepwise function associated with a step in N-step stride, function of quantities with even indices, function of quantities with odd indices, function of quantities with any indices, function of quantities of first wavefront of indices in N-step stride (1, N+1, 2N+1, 3N+1, . . . ), function of phase 1 quantities in N-step stride, function of quantities of second wavefront of indices in N-step stride (2, N+2, 2N+2, 3N+2, . . . ), function of phase 2 quantities in N-step stride, function of quantities of k-th wavefront of indices in N-step stride (k, N+k, 2N+k, 3N+k, . . . ), function of phase k quantities in N-step stride, harmonic ratio (HR), ratio of sum of amplitude of even harmonics of Fourier transform to sum of amplitude of odd harmonics of Fourier transform, composite function of a function of even harmonics of a transform and another function of odd harmonics of the transform, harmonic feature, odd-even symmetry, odd-even asymmetry, addition, subtraction, multiplication, division, derivative, integration, summation, transform, transformation, filtering, convolution, smoothing, decomposition, projection, mean subtraction, thresholding, quantization, vector quantization, normalization, indicator function, time scaling, mapping, recognition, detection, clustering, classification, time, timing, instantaneous value, mean, average, weighted average, arithmetic mean, geometric mean, harmonic mean, trimmed mean, moving average, short-term average, long-term average, historical average, median, percentile, mode, histogram, statistics, count, variability measure, variation measure, regularity measure, similarity measure, range, interquartile range, spread, variance, standard deviation, variability, deviation, divergence, dispersion, total variation, absolute deviation, total deviation, distance, metric, norm, maximum (max), minimum (min), local max, first max, second max, Nth max, local min, first min, second min, Nth min, optimization, constrained optimization, statistics, recurrent plot (RP), RP feature, at least one of: recurrent rate, determinism, entropy, and average diagonal line of RP, generalized RP (GRP), GRP feature, history, trend, weighted statistics, trimmed statistics, moving statistics, autocorrelation function (ACF), autocovariance function, cross correlation, cross covariance, grouping, count, combination, indicator, index, label, attribute, association, prediction, regularity measure, repeatability, spontaneity, and another quantity, associated with any of the above, an identification of at least one of: the object, the rhythmic motion, and a state of the object, and another analytics.

Clause B29: The method/apparatus/system of the rhythmic motion monitoring system of clause B23, further comprising: computing the analytics of the rhythmic motion based on at least one of the following operations: filtering, linear filtering, lowpass/bandpass/highpass filtering, mean filtering, mean subtraction, mean removal, FIR/HR filtering, convolution, matched filtering, Kalman filtering, MA/ARMA filtering, nonlinear filtering, median filtering, mode filtering, rank filtering, quartile filtering, percentile filtering, selective filtering, adaptive filtering, denoising, particle filtering, multi-stage filtering, nonlinear mapping, companding, folding, grouping, sorting, thresholding, soft thresholding, hard thresholding, clipping, soft clipping, interpolation, decimation, subsampling, upsampling, resampling, time correction, timebase correction, phase/magnitude correction or cleaning, enhancement, denoising, smoothing, signal conditioning, feature extraction, magnitude/phase/energy extraction, spectral analysis, linear transform, nonlinear transform, inverse transform, frequency transform, Fourier transform (FT), discrete time FT (DTFT), discrete FT (DFT), fast FT (FFT), wavelet transform, cosine transform, DCT, power-of-2 transform, sparse transform, graph-based transform, graph signal processing, fast transform, zero padding, decomposition, projection, orthogonal projection, non-orthogonal projection, over-complete projection, eigen-decomposition, singular value decomposition (SVD), principle component analysis (PCA), independent component analysis (ICA), first order derivative, second order derivative, higher order derivative, integration, summation, averaging, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised/unsupervised/semi-supervised learning, comparison with another TSCI, similarity score computation, quantization, vector quantization, matching pursuit, compression, encryption, coding, storing, transmitting, normalization, temporal normalization, frequency domain normalization, classification, tagging, learning, detection, estimation, learning network, mapping, remapping, expansion, storing, retrieving, transmitting, receiving, representing, merging, combining, splitting, tracking, monitoring, intrapolation, extrapolation, histogram estimation, importance sampling, Monte Carlo sampling, compressive sensing, representing, merging, combining, splitting, scrambling, error protection, forward error correction, decision feedback, doing nothing, addition, subtraction, multiplication, division, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and another operation.

Clause B30: The method/apparatus/system of the rhythmic motion monitoring system of clause B23, further comprising: computing a time series of the analytics of the rhythmic motion based on at least one of: the TSCI, the TSSI, the TSIQ, the TSSIQ, the time series of detected events, event times associated detected events, at least one complete cycle of the rhythmic motion and at least one partial cycle of the rhythmic motion.

Clause B31: The method/apparatus/system of the rhythmic motion monitoring system of clause B30, further comprising: identifying a particular analytics at a particular time as at least one of: questionable, erroneous, noisy, prone-to-error, and unreliable; generating a generated analytics as a replacement for the particular analytics at the particular time based on at least one of: an interpolation of temporally neighboring analytics, an interpolation of temporally neighboring IQ, and an interpolation of temporally neighboring CI.

Clause B32: The method/apparatus/system of the rhythmic motion monitoring system of clause B4, further comprising: preprocessing at least one of: the TSCI, TSIQ, TSSI, and TSSIQ, wherein the preprocessing comprises at least one of: filtering, linear filtering, lowpass/bandpass/highpass filtering, mean subtraction, mean removal, FIR/HR filtering, convolution, matched filtering, Kalman filtering, MA/ARMA filtering, nonlinear filtering, median filtering, mode filtering, rank filtering, quartile filtering, percentile filtering, selective filtering, adaptive filtering, denoising, particle filtering, multi-stage filtering, nonlinear mapping, companding, folding, grouping, sorting, thresholding, soft thresholding, hard thresholding, clipping, soft clipping, interpolation, decimation, subsampling, upsampling, resampling time correction, timebase correction, phase/magnitude correction or cleaning, enhancement, denoising, smoothing, signal conditioning, feature extraction, magnitude/phase/energy extraction, spectral analysis, linear transform, nonlinear transform, inverse transform, frequency transform, Fourier transform (FT), discrete time FT (DTFT), discrete FT (DFT), fast FT (FFT), wavelet transform, cosine transform, DCT, power-of-2 transform, sparse transform, graph-based transform, graph signal processing, fast transform, zero padding, decomposition, projection, orthogonal projection, non-orthogonal projection, over-complete projection, eigen-decomposition, singular value decomposition (SVD), principle component analysis (PCA), independent component analysis (ICA), first order derivative, second order derivative, higher order derivative, integration, summation, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised/unsupervised/semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, intrapolation, extrapolation, histogram estimation, importance sampling, Monte Carlo sampling, compressive sensing, representing, merging, combining, splitting, scrambling, error protection, forward error correction, decision feedback, doing nothing, addition, subtraction, multiplication, division, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and another operation.

Clause B33: The method/apparatus/system of the rhythmic motion monitoring system of clause B1, further comprising: wherein each SI comprises a 3-axis acceleration of the sensor moving with the object, the 3-axis acceleration being associated with the rhythmic motion of the object; computing a time series of features (TSF) based on the TSSI, each feature being an acceleration magnitude based on the 3-axis acceleration of respective SI; monitoring the rhythmic motion of the object based on the TSF.

Clause B34: The method/apparatus/system of the rhythmic motion monitoring system of clause B4, further comprising: wherein each SI comprises a 3-axis acceleration of the sensor moving with the object, the 3-axis acceleration being associated with the rhythmic motion of the object; computing a time series of features (TSF) based on the TSSI, each feature being an acceleration magnitude based on the 3-axis acceleration of respective SI; computing the TSSIQ based on the TSF.

Clause B35: The method/apparatus/system of the rhythmic motion monitoring system of clause B10, further comprising: wherein each SI comprises a 3-axis acceleration of the sensor moving with the object, the 3-axis acceleration being associated with the rhythmic motion of the object; computing a time series of features (TSF) based on the TSSI, each feature being an acceleration magnitude based on the 3-axis acceleration of respective SI; computing the series of detected events based on the TSF.

Clause B36: The method/apparatus/system of the rhythmic motion monitoring system of clause B1: wherein the response action comprises at least one of: storing an analytics computed based on the TSSI and TSCI and associated time stamp, communicating the analytics and the associated time stamp to at least one of: a server and a user device, generating a presentation based on the analytics, controlling a device, turn on a device, turn off a device, activating a functionality of the device, adjusting a controllable parameter of the device or the function, personalize the functionality, customizing the device, checking for related information, search for the related information, presenting the related information, notifying a user, signaling a condition, navigating a user, and another action.

Clause B37: The method/apparatus/system of the rhythmic motion monitoring system of clause B1: monitoring the rhythmic motion jointly based on at least one of: another TSCI extracted from another wireless signal transmitted between another Type1 heterogeneous wireless device and another Type 2 heterogeneous wireless device in the venue through another wireless multipath channel impacted by the rhythmic motion of the object in the venue, and another time series of another intermediate quantity computed based on the another TSCI.

Clause B38: The method/apparatus/system of the rhythmic motion monitoring system of clause B37: wherein the another Type 1 device is the Type 1 device; wherein the another wireless signal is the wireless signal.

Clause B39: The method/apparatus/system of the rhythmic motion monitoring system of clause B37: wherein the another Type 2 device is the Type 2 device.

Clause B40: The method/apparatus/system of the rhythmic motion monitoring system of clause B1: wherein at least one of: the Type1 device and the Type2 device, is a stationary device, wherein the other one of: the Type1 device and the Type2 device, is a moving device moving with the object.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A wireless monitoring system, comprising:
a transmitter configured for transmitting a series of probe signals in a venue through a wireless multipath channel;
a receiver that is asynchronous with respect to the transmitter and configured for:
receiving, through the wireless multipath channel between the transmitter and the receiver, the series of probe signals modulated by the wireless multipath channel and an object moving with the receiver in the venue, and
obtaining a time series of channel information (TSCI) of the wireless multipath channel from the series of probe signals modulated by the wireless multipath channel and the object; and
a processor configured for:
monitoring a motion of the object relative to a map based on the TSCI,
determining an incremental distance travelled by the object in an incremental time period based on the TSCI, and
computing a next location of the object at a next time in the maps, wherein computing the next location of the object comprises:
initializing an initial number of initial candidate locations of the object at an initial time,
computing iteratively a first dynamic number of first candidate locations of the object at the next time based on a second dynamic number of second candidate locations of the object at a current time,
computing the first dynamic number of weights each associated with a first candidate location, each weight being a function of: a current location of the object at the current time, a direction of the motion during the incremental time period, and a distance between the first candidate location and a first unreachable array element in the direction,
computing the next location of the object at the next time based on: the first dynamic number of first candidate locations at the next time, and the associated first dynamic number of weights.

2. The wireless monitoring system of claim 1, wherein the incremental time period is equal to a time difference between two respective probe signals of the series of probe signals.

3. The wireless monitoring system of claim 1, wherein the direction of the motion during the incremental time period is a function of at least one of: a direction of the motion at the current time, a direction of the motion at the next time, and a direction of the motion at another time.

4. The wireless monitoring system of claim 1, wherein the next location of the object at the next time in the map is computed using a particle filter.

5. The wireless monitoring system of claim 1, wherein computing the next location of the object at the next time comprises:
computing the next location of the object at the next time based on at least one of: the first dynamic number of first candidate locations at the next time, and the second dynamic number of second candidate locations at the current time.

6. The wireless monitoring system of claim 5, wherein:
the object moves during the incremental time period in a region represented by the map;
the map is a multi-dimensional map represented as a multi-dimensional array A, such that reachability of each location of the region is represented by a corresponding array element a which is a logical value between 0 and 1;
a location of the region is unreachable and forbidden when the corresponding array element satisfies a=0;
a location of the region is fully reachable when the corresponding array element satisfies a=1;
a location of the region is partially reachable when the corresponding array element satisfies: 0<a<1;
each of the next location, the current location, the first dynamic number of first candidate locations, and the second dynamic number of second candidate locations, is a point in the region and is represented as a corresponding array element a, with a>0; and
the direction of the motion of the object at any location is locally represented as one of a number of allowable directions.

7. The wireless monitoring system of claim 1, wherein each weight is a monotonic non-decreasing function of the distance between the first candidate location and the first unreachable array element in the direction.

8. The wireless monitoring system of claim 1, wherein each weight is a bounded function of the distance between the first candidate location and the first unreachable array element in the direction.

9. The wireless monitoring system of claim 1, wherein the next location of the object at the next time is computed as a weighted average of the first dynamic number of first candidate locations.

10. The wireless monitoring system of claim 1, wherein the next location of the object at the next time is computed as one of the first candidate locations.

11. The wireless monitoring system of claim 1, wherein computing the next location of the object at the next time further comprises: normalizing the weights to generate normalized weights.

12. The wireless monitoring system of claim 11, wherein computing the next location of the object at the next time further comprises:
computing a weighted cost of each first candidate location with respect to the rest of the first dynamic number of first candidate locations based on the normalized weights, wherein the weighted cost is a weighted sum of pairwise distance between the first candidate location and each of the rest of the first candidate locations; and
choosing the first candidate location with a minimum weighted cost as the next location of the object.

13. The wireless monitoring system of claim 6, wherein computing the next location of the object at the next time comprises:
computing a predicted value for each of the second candidate locations of the object based on at least one of: the second candidate location, the incremental distance, and the incremental time period;
when the predicted value of the second candidate location is fully reachable with associated array element a=1, creating a first candidate location of the object based on the predicted value of the second candidate location;
when the predicted value of the second candidate location is forbidden with associated array element a=0, labeling the second candidate location as "rejected" without creating any first candidate location; and
when the predicted value of the second candidate location is partially reachable with associated array element satisfying 0<a<1, generating a random number between 0 and 1, and creating a first candidate location of the object based on the predicted value of the second candidate location when the random number is less than a.

14. The wireless monitoring system of claim 13, wherein computing the next location of the object at the next time further comprises: when a quantity of the first candidate locations is smaller than a threshold, generating a new first candidate location of the object by probabilistically taking on the predicted values of second candidate locations that are not rejected, with a probability distribution based on at least one of:
weights associated with the predicted values;
weights associated with the second candidate locations;
array elements of the multi-dimensional array A associated with the predicted values; and
array elements of the multi-dimensional array A associated with the second candidate locations.

15. The wireless monitoring system of claim 13, wherein computing the next location of the object at the next time further comprises: when a quantity of the first candidate locations is smaller than a threshold, generating a new first candidate location of the object by probabilistically taking on the second candidate locations that are not rejected, with a probability based on weights associated with the predicted values of the second candidate locations that are not rejected.

16. The wireless monitoring system of claim 13, wherein computing the next location of the object at the next time further comprises: when a quantity of the first candidate locations is smaller than a threshold, computing a tentative next location based on the first candidate locations and generating a new first candidate location of the object probabilistically in a neighborhood of the tentative next location based on a probability distribution.

17. The wireless monitoring system of claim 13, wherein computing the next location of the object at the next time further comprises: when a quantity of the first candidate locations is smaller than a threshold, generating a new first candidate location of the object probabilistically based on a predictor of a location sampled in a neighborhood of the current location based on a probability distribution.

18. The wireless monitoring system of claim 17, wherein the neighborhood comprises at least one of the second candidate locations that are not rejected.

19. The wireless monitoring system of claim 17, wherein the probability distribution is a weighted sum of a set of probability density functions, each centered at one of the second candidate locations that are not rejected.

20. The wireless monitoring system of claim 19, wherein:
a weight of each pdf associated with a second candidate location in the weighted sum is a function of the array element associated with the second candidate location.

21. The wireless monitoring system of claim 1, further comprising:
maintaining a dynamic number of candidate locations at any time;
changing the dynamic number of candidate locations by at least one of:
initializing at least one candidate location,
updating at least one candidate location,
adding at least one candidate location,
pausing at least one candidate location,
stopping at least one candidate location,
resuming at least one paused candidate location,
reinitializing at least one stopped candidate location, and
removing at least one candidate location; and
computing the next location of the object at the next time based on at least one of: the dynamic number of candidate locations at the next time, and the dynamic number of candidate locations at another time.

22. The wireless monitoring system of claim 21, wherein the dynamic number of candidate locations is bounded by at least one of: an upper limit and a lower limit.

23. The wireless monitoring system of claim 21, further comprising: adding at least one candidate location when the dynamic number of candidate locations is lower than a lower limit.

24. A method, implemented by a processor, a memory communicatively coupled with the processor, and a set of instructions stored in the memory to be executed by the processor, comprising:
obtaining a time series of channel information (TSCI) of a wireless multipath channel in a venue, wherein:
the TSCI is extracted from a series of probe signals transmitted from a transmitter to a receiver through the wireless multipath channel,
the receiver is asynchronous with respect to the transmitter, and
the series of probe signals are modulated by the wireless multipath channel and an object moving with the receiver in the venue;
monitoring a motion of the object relative to a map based on the TSCI;
determining an incremental distance travelled by the object in an incremental time period based on the TSCI; and
computing a next location of the object at a next time in the maps, wherein computing the next location of the object comprises:
initializing an initial number of initial candidate locations of the object at an initial time,
computing iteratively a first dynamic number of first candidate locations of the object at the next time based on a second dynamic number of second candidate locations of the object at a current time,
computing the first dynamic number of weights each associated with a first candidate location, each weight being a function of: a current location of the object at the current time, a direction of the motion during the incremental time period, and a distance between the first candidate location and a first unreachable array element in the direction,
computing the next location of the object at the next time based on: the first dynamic number of first candidate locations at the next time, and the associated first dynamic number of weights.

25. The method of claim 24, wherein the incremental time period is equal to a time difference between two respective probe signals of the series of probe signals.

26. The method of claim 24, wherein the direction of the motion during the incremental time period is a function of at least one of: a direction of the motion at the current time, a direction of the motion at the next time, and a direction of the motion at another time.

27. The method of claim 24, wherein the next location of the object at the next time in the map is computed using a particle filter.

28. The method of claim 24, wherein computing the next location of the object at the next time comprises:
   initializing an initial number of initial candidate locations of the object at an initial time;
   computing iteratively a first dynamic number of first candidate locations of the object at the next time based on a second dynamic number of second candidate locations of the object at the current time; and
   computing the next location of the object at the next time based on at least one of: the first dynamic number of first candidate locations at the next time, and the second dynamic number of second candidate locations at the current time.

29. A wireless monitoring system, comprising:
   a transmitter configured for transmitting a series of probe signals in a venue through a wireless multipath channel;
   a plurality of heterogeneous receivers each of which is configured for:
      receiving, through the wireless multipath channel, the series of probe signals modulated by the wireless multipath channel and a plurality of objects each moving with a corresponding one of the plurality of heterogeneous receivers in the venue, and
      obtaining a time series of channel information (TSCI) of the wireless multipath channel from the series of probe signals modulated by the wireless multipath channel and the plurality of objects; and
   a processor configured for:
      monitoring motions of the plurality of objects relative to a map based on the TSCIs obtained by the plurality of heterogeneous receivers,
      determining a respective incremental distance travelled by each object in a respective incremental time period based on a respective TSCI,
      computing a dynamic number of weights each associated with a first candidate location of the object at a respective next time, each weight being a function of: a respective current location of the object at a respective current time, a respective direction of the respective motion of the object during the respective incremental time period, and a respective distance between the first candidate location and a first unreachable array element in the respective direction, and
      computing a respective next location of the object at the respective next time in the map based on the dynamic number of weights and the associated first candidate locations.

* * * * *